(12) United States Patent
Wei et al.

(10) Patent No.: US 12,323,234 B2
(45) Date of Patent: Jun. 3, 2025

(54) CROSS-NETWORK TIME SYNCHRONIZATION METHOD FOR INDUSTRIAL WIRELESS NETWORK AND TSN FUSION

(71) Applicant: CHONGQING UNIVERSITY OF POSTS AND TELECOMMUNICATIONS, Nan'an District Chongqing (CN)

(72) Inventors: Min Wei, Nan'an District Chongqing (CN); Xiaoyun Li, Nan'an District Chongqing (CN); Shuang Niu, Nan'an District Chongqing (CN); Qingyun Fu, Nan'an District Chongqing (CN); Yiming Xing, Nan'an District Chongqing (CN); Ping Wang, Nan'an District Chongqing (CN)

(73) Assignee: CHONGQING UNIVERSITY OF POSTS AND TELECOMMUNICATIONS, Chongqing (CN)

( * ) Notice: Subject to any disclaimer, the term of this patent is extended or adjusted under 35 U.S.C. 154(b) by 0 days.

(21) Appl. No.: 18/008,268

(22) PCT Filed: May 7, 2022

(86) PCT No.: PCT/CN2022/091457
§ 371 (c)(1),
(2) Date: Dec. 5, 2022

(87) PCT Pub. No.: WO2023/077760
PCT Pub. Date: May 1, 2023

(65) Prior Publication Data
US 2024/0243829 A1    Jul. 18, 2024

(30) Foreign Application Priority Data
Nov. 8, 2021 (CN) .......................... 202111323593.1

(51) Int. Cl.
*H04J 3/06* (2006.01)

(52) U.S. Cl.
CPC .......... *H04J 3/0644* (2013.01); *H04J 3/0661* (2013.01)

(58) Field of Classification Search
CPC ............................. H04J 3/0644; H04J 3/0661
(Continued)

(56) References Cited

U.S. PATENT DOCUMENTS 11,336,383 B2 *    5/2022    Mula ..................... H04J 3/0667
11,974,238 B2 *    4/2024    Van Phan .......... G05B 19/4155
(Continued)

*Primary Examiner* — Faisal Choudhury
(74) *Attorney, Agent, or Firm* — Michael D. Eisenberg

(57) ABSTRACT

The present invention relates to a cross-network time synchronization method for industrial wireless network and TSN fusion, which belongs to the field of Industrial Internet, comprising the following steps: S1: conducting clock synchronization by a TSN module of a border gateway with a TSN switch of a TSN 2 in a slave clock state; S2: inside the border gateway, using the TSN module as a master clock of an industrial wireless module, and conducting clock synchronization by the industrial wireless module with the TSN module through a serial port; S3: conducting clock synchronization by a routing device in the industrial wireless network with the industrial wireless module of the border gateway through a beacon frame synchronization mode in the slave clock state, and conducting clock synchronization by the routing device as the master clock of a node device for the node device; S4: conducting clock synchronization by a terminal side conversion node in the slave clock state with the node device in the industrial wireless network through a timestamp-free synchronization mode, and finally, synchronizing a TSN switch of a TSN 1 with the terminal side conversion node in the slave clock state.

9 Claims, 3 Drawing Sheets

(58) Field of Classification Search
USPC .......................................................... 370/503
See application file for complete search history.

(56) References Cited

U.S. PATENT DOCUMENTS

2023/0083152 A1* 3/2023 Fu ...................... H04W 56/0015
  370/350
2024/0172146 A1* 5/2024 Lin .................... H04W 56/0015

* cited by examiner

CROSS-NETWORK TIME SYNCHRONIZATION METHOD FOR INDUSTRIAL WIRELESS NETWORK AND TSN FUSION

FIELD OF INVENTION

The present invention belongs to the field of industrial Internet, and relates to a cross-network time synchronization method for industrial wireless network and Time-Sensitive Networking (TSN) fusion.

BACKGROUND ART OF THE INVENTION

Intranets, such as industrial control network and management network, of the traditional manufacturing plants can be considered as closed networks and cannot be accessed by the outside world. With the development, application and promotion of intelligent manufacturing, an internal network needs to be connected with an external network; at the same time, a wireless communication technology must be used in industrial scenarios that upgrade, reformation and wiring of rotating mechanical equipment and old factories are inconvenient, and production sites of oil and gas pipelines are too far; more industrial interconnection applications, such as machine-to-machine interaction and collaboration, factory logistics, remote maintenance of large-scale manufacturing equipment, and AR/VR, require wireless communication to satisfy the efficiency need and various performance indicators. At present, the research of convergence networks including wired and wireless technologies has a certain foundation and has begun to be widely deployed in automation systems, smart cities and home area networks. On the one hand, a wired network has higher reliability and performance due to topological stability and smaller packet loss rates; and on the other hand, network connectivity requirements are different in terms of spatial range mobility, energy consumption, data throughput, timeliness, reliability and other features. Therefore, it is necessary to combine wired and wireless network technologies to provide required service quality for factory networks.

Industrial control services need to be carried by a network with definite time delay and reliable guarantee. TSN receives extensive attention because of the forwarding capability of definite time delay and compatibility with Ethernet protocols. However, wired TSN cannot satisfy the extensive deployment needs of novel devices such as massive sensors and AGVs in smart factories. Cooperative transmission between an industrial wireless network and TSN becomes a research hotspot in the field of industry and automation.

Clock synchronization refers to a process of limiting a deviation between a clock of a device in a system and a specific time information source within a certain range, and is a particularly important technology in a distributed system. Its purpose is to establish a global time concept with predefined precision by ensuring a finite maximum offset between any two nodes. Especially in the industrial control network, many basic operations in the network, such as object tracking, deterministic scheduling and resource management, are inseparable from clock synchronization, which means that all nodes in the network need to share a unified time scale.

When the factory network combines the wireless network and the wired network which are two networks of different communication protocols, how to conduct cross-network time synchronization becomes a challenging problem. At present, there are few researches on cross-network time synchronization in China and abroad. Due to high requirements of an industrial heterogeneous network for the features of timeliness and low delay, direct use of the existing methods cannot satisfy the needs of novel industrial heterogeneous networks.

DISCLOSURE OF THE INVENTION

In view of this, the purpose of the present invention is to effectively conduct cross-network time synchronization to research time modeling and time error compensation models between synchronization nodes in the heterogeneous networks by taking the heterogeneous networks as objects in combination with statistical algorithms through synchronization modes such as IEEE 802.1AS, beacon frame synchronization and timestamp-free synchronization, so as to enhance cross-network time synchronization accuracy.

To achieve the above purpose, the present invention provides the following technical solution: A cross-network time synchronization method for industrial wireless network and TSN fusion comprises the following steps:

S1: conducting clock synchronization by a TSN module of a border gateway with a TSN switch of a TSN 2 in a slave clock state;

S2: inside the border gateway, using the TSN module as a master clock of an industrial wireless module, and conducting clock synchronization by the industrial wireless module with the TSN module through a serial port so that time information is forwarded from a TSN 1 to an industrial wireless network;

S3: conducting clock synchronization by a routing device in the industrial wireless network with the industrial wireless module of the border gateway through a beacon frame synchronization mode in the slave clock state, and conducting clock synchronization by the routing device as the master clock of a node device for the node device, to ensure clock synchronization of the industrial wireless network;

S4: conducting clock synchronization by a terminal side conversion node in the slave clock state with the node device in the industrial wireless network through a timestamp-free synchronization mode; independent of a special synchronization protocol, only following the existing network data flow to complete synchronization parameter estimation, to forward the time information from the industrial wireless network to the TSN 1; and then completing clock synchronization by the TSN switch of the TSN 1 with the terminal side conversion node in the slave clock state.

Further, step S1 specifically comprises the following steps:

S11: obtaining timestamps t1, t2, t3 and t4 by a slave clock by using a peer-to-peer delay measurement mechanism;

S12: calculating link delay of the master clock and the slave clock by the slave clock;

S13: calculating processing time denoted as time_process by the slave clock;

S14: denoting a sum of the link delay and the processing time as $\Delta 1$.

Further, in step S1, the delay measurement mechanism is used to measure the link delay of the master clock and the slave clock; corresponding timestamps are obtained by exchanging a delay request message Delay rep and a delay response message Delay_resp between the slave clock and the master clock; Delay_resp(t2) represents that the delay response message replied to the slave clock at time t3 by the master clock carries time t2; Follow_up_delay_resp(t3) represents that a follow-up delay response message sent by the master clock to the slave clock carries time t3; after a Follow_up_delay_resp message is sent, the slave clock receives the timestamps t1, t2, t3 and t4; the link delay delay_resp between the slave clock and the master clock is calculated as shown by expression (1):

$$\text{delay\_resp} = \frac{(t2 - t1) + (t4 - t3)}{2} \quad (1)$$

the processing time is local time, which is duration time of a time interval between reception of a time synchronization event message by the master clock and transmission of a next subsequent time synchronization event message by the master clock; and the processing time is denoted as time_process, which is t3 here;

the sum of the link delay and the processing time is denoted as Δ1=delay_resp+time_process.

Further, the border gateway comprises an industrial wireless module and a TSN module; an Serial Line Internet Protocol (SLIP) is used to encapsulate IP data packets; and transparency of data transmission is ensured through an SLIP serial port, so that data is seamlessly connected between two networks.

Further, in step S2, a synchronization pulse signal outputted by a TSN module clock is a 1Pulse Per Second (PPS) pulse, and the industrial wireless module adjusts own local time by detecting the synchronization pulse signal outputted by the TSN module clock, comprising the following steps:

S21: sending, by the TSN module, an own initial clock $T_0$ to the industrial wireless module through a serial port, and setting, by the industrial wireless module, own local initial time local_time0 according to time;

S22: starting an interrupt program to start to detect a 1 PPS pulse signal outputted by the TSN module, and when detecting a 1 PPS signal by the industrial wireless module, denoting time of receiving the 1 PPS signal as local_time1.

S23: correcting an own local clock once by the industrial wireless module;

assuming that the industrial wireless module is corrected at time local_time2, corrected time local_time satisfies the following expression:

$$\text{local\_time0} = T_0 + \frac{S}{R} \quad (2)$$

$$\text{local\_time} = \text{local\_time2} + N - \text{local\_time1} \quad (3)$$

where S represents length of a serial port message, R represents a serial port baud rate, and N represents number of pulses received by the industrial wireless module.

Further, in step S3, the industrial wireless module is denoted as A, the routing device is denoted as $P_1$, and the node device is denoted as $P_2$.

Time when node A sends a time message to node $P_1$ to time when node $P_1$ receives the message is a synchronization cycle of interaction between node A and node $P_1$, and a process between node A and node $P_1$ is repeated for N times to generate N synchronization cycles; after each time two nodes conduct one-way interaction of time information (i.e., one synchronization cycle), node $P_1$ calculates clock frequency offset through the timestamp information for adjustment;

After adjustment of node $P_1$, a time message is sent to node $P_2$; time when node $P_1$ sends the time message to node $P_2$ to time when node $P_2$ receives the message is a synchronization cycle of interaction between node $P_1$ and node $P_2$; a process between node $P_1$ and node $P_2$ is repeated for N times to generate N synchronization cycles; after each time two nodes conduct one-way interaction of time information (i.e., one synchronization cycle), node $P_2$ calculates clock frequency offset through the timestamp information for adjustment.

Reference node A and first-layer node $P_1$ In a first synchronization cycle between node A and node $P_1$, node A sends current time information $T_{1,1}^{(A)}$ to node $P_1$, and receiving time $T_{2,1}^{(P_1)}$ recorded by $P_1$ is represented as:

$$T_{2,1}^{(P_1)} = T_{1,1}^{(A)} + \theta_{t0}^{(AP_1)} + \rho^{(AP_1)}(T_{1,1}^{(A)} - t_0) + \quad (4)$$
$$d^{(AP_1)} + X_1^{(AP_1)} + \rho^{(AP_1)}(d^{(AP_1)} + X_1^{(AP_1)})$$

In a formula, $\theta_{t0}^{(P_1)}$ represents an initial clock offset of node $P_1$ relative to reference node A at time $t_0$; $\rho^{(AP_1)}$ represents a clock frequency offset of node $P_1$ relative to reference node A; $d^{(AP_1)}$ represents fixed time delay generated in a process of receiving and sending time information, with a value range of 1 ms-10 ms. $X^{(AP_1)}$ represents random time delay generated in the process of receiving and sending time information; $\rho^{(AP_1)}(d^{(AP_1)}+X^{(AP_1)})$ represents a synchronization error accumulated due to frequency offset in the process of receiving and sending time information;

Further, in the first synchronization cycle of node A and node $P_1$, a difference $\Delta T_1^{(AP_1)}$ of receiving and sending timestamps between node A and node $P_1$ to be synchronized is represented as:

$$\Delta T_1^{(AP_1)} = T_{2,1}^{(P_1)} - T_{1,1}^{(A)} - d^{(AP_1)} = \quad (5)$$
$$\theta_{t0}^{(AP_1)} + \rho^{(AP_1)}(T_{1,1}^{(A)} - t_0) + X_1^{(AP_1)} + \rho^{(AP_1)}(d^{(AP_1)}(d^{(AP_1)} + X_1^{(AP_1)})$$

$T_{5,1}^{(P_1)}$ is correction time of the first cycle of $P_1$; then, node $P_1$ uses the difference $\Delta T_1^{(AP_1)}$ to adjust the own local clock at time $T_{5,1}^{(P_1)}$ and time adjusted by $P_1$ is represented by $T_{5,1}^{(P_1)*}$ and there is $$T_{5,1}^{(P_1)*} = T_{5,1}^{(P_1)} + \Delta T_1^{(AP_1)} = T_{5,1}^{(P_1)} + T_{2,1}^{(P_1)} - T_{1,1}^{(A)} - d^{(AP_1)} \quad (6)$$

In a period from initial time $t_0$ to the correction time $T_{5,1}^{(P_1)}$, a real clock deviation $\Delta T_{true,1}^{(AP_1)}$ between node A and node $P_1$ is:

$$\Delta T_{true,1}^{(AP_1)} = \theta_{t0}^{(AP_1)} + \rho^{(AP_1)}(T_{5,1}^{(P_1)} - t_0) \quad (7)$$

From formulas (7)-(5), a new clock offset $\theta_{t1}^{(AP_1)}$ of node $P_1$ after adjustment is obtained as:

$$\theta_{t1}^{(AP_1)} = \quad (8)$$
$$\Delta T_{true,1}^{(AP_1)} - \Delta T_1^{(AP_1)} = \rho^{(AP_1)}(T_{5,1}^{(P_1)} - T_{1,1}^{(A)} - d^{(AP_1)} - X_1^{(AP_1)}) - X_1^{(AP_1)}$$

In a second synchronization cycle between node A and node $P_1$, node A sends current time information $T_{1,2}^{(A)}$ to node $P_1$, and receiving time $T_{2,2}^{(P_1)}$ recorded by node $P_1$ is represented as:

$$T_{2,2}^{(P_1)} = T_{1,2}^{(A)} + \theta_{t1}^{(AP_1)} + \rho^{(AP_1)}\left(T_{1,2}^{(A)} - T_{5,1}^{(P_1)*}\right) + \qquad (9)$$
$$d^{(AP_1)} + X_2^{(AP_1)} + \rho^{(AP_1)}\left(d^{(AP_1)} + X_2^{(AP_1)}\right)$$

where $X_2^{(AP_1)}$ is random time delay generated in a process of receiving and sending time information of the second synchronization cycle between node A and node $P_1$.

Further, in the second synchronization cycle of node A and node $P_1$, a difference $\Delta T_2^{(AP_1)}$ of receiving and sending timestamps between reference node A and node $P_1$ is represented as:

$$\Delta T_2^{(AP_1)} = T_{2,2}^{(P_1)} - T_{1,2}^{(A)} - d^{(AP_1)} = \qquad (10)$$
$$\theta_{t1}^{(AP_1)} + \rho^{(AP_1)}\left(T_{1,2}^{(A)} - T_{5,1}^{(P_1)*}\right) + X_2^{(AP_1)} + \rho^{(AP_1)}\left(d^{(AP_1)} + X_2^{(AP_1)}\right)$$

Time of $P_1$ after adjustment in the first synchronization cycle is set as $T_{5,1}^{(P_1)*}$ and time of node A, corresponding to the time, is $T_{5,1}^{(A)*}$; at this moment, because node $P_1$ just adjusts local time and time of node A is close to time of node $P_1$, $T_{5,1}^{(P_1)*} = T_{5,1}^{(A)*}$ is set; formula (10) is changed as:

$$\Delta T_2^{(AP_1)} = \qquad (11)$$
$$\theta_{t1}^{(AP_1)} + \rho^{(AP_1)}\left(T_{1,2}^{(A)} - T_{5,1}^{(A)*}\right) + X_2^{(AP_1)} + \rho^{(AP_1)}\left(d^{(AP_1)} + X_2^{(AP_1)}\right)$$

$\theta_{t1}^{(AP_1)}$ and $T_{5,1}^{(A)*}$ are substituted into formula (11) to obtain:

$$\Delta T_2^{(AP_1)} = \qquad (12)$$
$$\rho^{(AP_1)}\left(T_{1,2}^{(A)} - X_1^{(AP_1)} + X_2^{(AP_1)} - T_{2,1}^{(P_1)} + d^{(AP_1)}\right) - X_1^{(AP_1)} + X_2^{(AP_1)}$$

In a period from $T_{5,1}^{(P_1)*}$ to $T_{5,2}^{(P_1)}$ (i.e., in the second synchronization cycle between node A and node $P_1$), a real clock deviation $\Delta T_{true,2}^{(AP_1)}$ between node A and node $P_1$ is:

$$\Delta T_{true,2}^{(AP_1)} = \theta_{t1}^{(AP_1)} + \rho^{(AP_1)}\left(T_{5,2}^{(P_1)} - T_{5,1}^{(P_1)*}\right) \qquad (13)$$

where $T_{5,2}^{(P_1)}$ is correction time of $P_1$ in the second cycle of node A and node $P_1$.

From formulas (13)-(12), a new clock offset $\theta_{t2}^{(AP_1)}$ of node $P_1$ after second adjustment is obtained as:

$$\theta_{t2}^{(AP_1)} = \qquad (14)$$
$$\Delta T_{true,2}^{(AP_1)} - \Delta T_2^{(AP_1)} = \rho^{(AP)}\left(T_{5,2}^{(P_1)} - T_{1,2}^{(A)} - d^{(AP_1)} - X_2^{(AP_1)}\right) - X_2^{(AP_1)}$$

In an $i^{th}$ synchronization cycle of node A and node $P_1$, a difference $\Delta T_i^{(AP_1)}$ of receiving and sending timestamps between reference node A and node $P_1$ is obtained as:

$$\Delta T_i^{(AP_1)} = \qquad (15)$$
$$\rho^{(AP_1)}\left(T_{1,i}^{(A)} - X_{i-1}^{(AP_1)} + X_i^{(AP_1)} - T_{2,i-1}^{(P_1)} + d^{(AP_1)}\right) - X_{i-1}^{(AP_1)} + X_i^{(AP_1)}$$

where $X_i^{(AP_1)}$ is random time delay generated in a process of receiving and sending time information of the $i^{th}$ cycle between node A and node $P_1$.

A new clock offset $\theta_{ti}^{(AP_1)}$ of node $P_1$ after $i^{th}$ adjustment is:

$$\theta_{ti}^{(AP_1)} = \qquad (16)$$
$$\Delta T_{true,i}^{(AP_1)} - \Delta T_i^{(AP_1)} = \rho^{(AP_1)}\left(T_{5,i}^{(P_1)} - T_{1,i}^{(A)} - d^{(AP_1)} - X_i^{(AP_1)}\right) - X_i^{(AP_1)}$$

To simplify calculation, formula (15) is transformed into the following expression:

$$\Delta T_i^{(AP_1)} = \rho^{(AP_1)}\left(T_{1,i}^{(A)} - T_{2,i-1}^{(P_1)} - d^{(AP_1)}\right) + \left(1 + \rho^{(AP_1)}\right)\left(X_i^{(AP_1)} - X_{i-1}^{(AP_1)}\right) \qquad (17)$$

$Q_i = X_i^{(AP_1)} - X_{i-1}^{(AP_1)}$ is made; because random time delay $X_i^{(AP_1)}$ and $X_{i-1}^{(AP_1)}$ can be regarded as random variables which have the same average and obey Gaussian distribution, it is easy to know that $Q_i$ is also a random variable which obeys Gaussian distribution, i.e., $Q_i \sim (0, \delta^2)$; frequency offset $\rho^{(AP_1)}$ is estimated by using a maximum likelihood estimation method; and a log-likelihood function of formula (17) based on observed quantity $\{T_{2,i}^{(P_1)}, T_{1,i}^{(A)}, d^{(AP_1)}\}_{i=1}^N$ is represented as:

$$\ln L\left(\rho^{(AP_1)}, \delta^2\right) = \qquad (18)$$
$$-\frac{N}{2}\ln(2\pi\delta^2) - \frac{1}{2\delta^2}\Sigma_{i=1}^N\left[\frac{T_{2,i}^{(P_1)} - T_{1,i}^{(A)} - d^{(AP_1)} - \rho^{(AP_1)}\left(T_{1,i}^{(A)} - T_{2,i-1}^{(P_1)}\right)}{1 + \rho^{(AP_1)}}\right]^2$$

A partial derivative of $\rho^{(AP_1)}$ is calculated and made as 0:

$$\frac{\partial \ln L\left(\rho^{(AP_1)}, \delta^2\right)}{\partial \rho^{(AP_1)}} = \frac{\sum_{i=1}^N\left[\left(T_{2,i}^{(P_1)} - T_{1,i}^{(A)} - d^{(AP_1)} - \rho^{(AP_1)}\left(T_{1,i}^{(A)} - T_{2,i-1}^{(P_1)}\right)\right)\left(T_{2,i}^{(P_1)} - T_{2,i-1}^{(P_1)} - d^{(AP_1)}\right)\right]}{\left(1 + \rho^{(AP_1)}\right)^3} = 0$$

A solution is obtained as:

$$\rho^{(AP_1)} = \frac{\sum_{i=1}^N\left(T_{2,i}^{(P_1)} - T_{1,i}^{(A)} - d^{(AP_1)}\right)\left(T_{2,i}^{(P_1)} - T_{2,i-1}^{(P_1)} - d^{(AP_1)}\right)}{\sum_{i=1}^N\left(T_{1,i}^{(A)} - T_{2,i-1}^{(P_1)}\right)\left(T_{2,i}^{(P_1)} - T_{2,i-1}^{(P_1)} - d^{(AP_1)}\right)} \qquad (19)$$

$P_1$ only needs to obtain parameters in formula (19) to estimate $\rho^{(AP_1)}$. By selecting appropriate $d^{(AP_1)}$ value, $\rho^{(AP_1)}$ can be adjusted so that frequencies of node $P_1$ and node A are gradually close, to complete time synchronization of $P_1$ and A.

Further, in step S3, first-layer node $P_1$ and second-layer node $P_2$ are included. After node $P_1$ receives the time information from reference node A, a reference node as node $P_2$ after adjustment of an own local clock is calculated according to timestamps. Similarly, node $P_2$ uses node $P_1$ as the reference node, and node $P_1$ sends the time information to node $P_2$;

In the first synchronization cycle between node $P_1$ and node $P_2$, node $P_1$ sends current time information $T_{1,1}^{(P_1)}$ to node $P_2$, and time when node $P_2$ receives the time information sent by node $P_1$ is denoted as $T_{2,1}^{(P_2)}$, which is represented as:

$$T_{2,1}^{(P_2)} = T_{1,1}^{(P_1)} + \theta_{t0}^{(P_1 P_2)} + \rho^{(P_1 P_2)}(T_{1,1}^{(P_1)} - t_0) + \qquad (20)$$
$$d^{(P_1 P_2)} + X_1^{(P_1 P_2)} + \rho^{(P_1 P_2)}(d^{(P_1 P_2)} + X_1^{(P_1 P_2)})$$

In a formula, $\theta_{t0}^{(P_1 P_2)}$ represents an initial clock offset of node $P_2$ at time $t_0$ relative to reference node $P_1$; $\rho^{(P_1 P_2)}$ represents a clock frequency offset of node $P_2$ relative to reference node $P_1$; $d^{(P_1 P_2)}$ represents fixed time delay generated in a process of receiving and sending time information, with a value range of 1 ms-10 ms. $X_1^{(P_1 P_2)}$ represents random time delay generated in the process of receiving and sending time information; $\rho^{(P_1 P_2)}(d^{(P_1 P_2)} + X_1^{(P_1 P_2)})$ represents a synchronization error accumulated due to frequency offset in the process of receiving and sending time information;

In the first synchronization cycle of node $P_1$ and node $P_2$, a difference $\Delta T_1^{(P_1 P_2)}$ of receiving and sending timestamps between node $P_1$ and node $P_2$ is:

$$\Delta T_1^{(P_1 P_2)} = T_{2,1}^{(P_2)} - T_{1,1}^{(P_1)} - d^{(P_1 P_2)} = \qquad (21)$$
$$\theta_{t0}^{(P_1 P_2)} + \rho^{(P_1 P_2)}(T_{1,1}^{(P_1)} - t_0) + X_1^{(P_1 P_2)} + \rho^{(P_1 P_2)}(d^{(P_1 P_2)} + X_1^{(P_1 P_2)})$$

$T_{5,1}^{(P_2)}$ is correction time of $P_2$ in the first synchronization cycle of node $P_1$ and node $P_2$; then, node $P_2$ uses the difference $\Delta T_1^{(P_1 P_2)}$ of the timestamps to adjust the local clock at time $T_{5,1}^{(P_2)}$ and adjusted local time is represented by $T_{5,1}^{(P_2)*}$, and there is $T_{5,1}^{(P_2)*} = T_{5,1}^{(P_2)} + \Delta T_1^{(P_1 P_2)}$;

In a period from the initial time to the correction time, a real clock deviation $\Delta T_{true,1}^{(P_1 P_2)}$ between node $P_1$ and node $P_2$ is:

$$\Delta T_{true,1}^{(P_1 P_2)} = \theta_{t0}^{(P_1 P_2)} + \rho^{(P_1 P_2)}(T_{5,1}^{(P_2)} - t_0) \qquad (22)$$

From formulas (22)-(21), a new clock offset $\theta_{t1}^{(P_1 P_2)}$ of node $P_2$ after adjustment in the first synchronization cycle of node $P_1$ and node $P_2$ is:

$$\theta_{t1}^{(P_1 P_2)} = \Delta T_{true,1}^{(P_1 P_2)} - \Delta T_1^{(P_1 P_2)} = \qquad (23)$$
$$\rho^{(P_1 P_2)}(T_{5,1}^{(P_2)} - T_{1,1}^{(P_1)} - d^{(P_1 P_2)} - X_1^{(P_1 P_2)}) - X_1^{(P_1 P_2)}$$

In the second synchronization cycle between node $P_1$ and node $P_2$, reference node $P_1$ needs to use a difference $\Delta T_1^{(AP_1)}$ of the receiving and sending timestamps of node A and node $P_1$ in the first synchronization cycle to correct an own local clock in each cycle, so for nodes $P_2$ and $P_1$, a difference $\Delta T_1^{(P_1 P_2)}$ of the receiving and sending timestamps in the second synchronization cycle is represented as:

$$T_{2,2}^{(P_2)} - T_{1,2}^{(P_1)} - d^{(P_1 P_2)} + \Delta T_1^{(AP_1)} = \qquad (24)$$
$$\theta_{t1}^{(P_1 P_2)} + \rho^{(P_1 P_2)}(T_{1,2}^{(P_1)} - T_{5,1}^{(P_2)*}) + X_2^{(P_1 P_2)} + \rho^{(P_1 P_2)}(d^{(P_1 P_2)} + X_2^{(P_1 P_2)})$$

where $T_{1,2}^{(P_1)}$ is sending time when node $P_1$ sends a synchronization message to node $P_2$ in the second synchronization cycle between node $P_1$ and node $P_2$; $T_{2,2}^{(P_2)}$ is receiving time when node $P_2$ receives the synchronization message in the second synchronization cycle between node $P_1$ and node $P_2$; $X_2^{(P_1 P_2)}$ is random time delay generated in a process of receiving and sending time information of the second synchronization cycle between node $P_1$ and node $P_2$;

$\theta_{t1}^{(P_1 P_2)}$ and $T_{5,1}^{(P_2)*}$ are substituted into formula (24) to obtain a difference $\Delta T_1^{(P_1 P_2)}$ of receiving and sending timestamps between node $P_1$ and node $P_2$ in the second synchronization cycle of node $P_1$ and node $P_2$:

$$\Delta T_2^{(P_1 P_2)} = T_{2,2}^{(P_2)} - T_{1,2}^{(P_1)} - d^{(P_1 P_2)} = \qquad (25)$$
$$\rho^{(P_1 P_2)}(T_{1,2}^{(P_1)} - T_{2,1}^{(P_2)} - X_1^{(P_1 P_2)} + X_2^{(P_1 P_2)} + d^{(P_1 P_2)}) -$$
$$X_1^{(P_1 P_2)} + X_2^{(P_1 P_2)} - (T_{2,1}^{(P_1)} - T_{1,1}^{(A)} - d^{(AP_1)})$$

where $T_{2,1}^{(P_2)}$ represents receiving time when node $P_2$ receives time information sent by node $P_1$ in the first synchronization cycle between node $P_1$ and node $P_2$; $T_{2,1}^{(P_1)}$ represents receiving time when node $P_1$ receives time information sent by node A in the first synchronization cycle between node A and node $P_1$; $T_{1,1}^{(A)}$ represents sending time when node A sends a time message to node $P_1$ in the first synchronization cycle between node A and node $P_1$.

$T_{5,2}^{(P_2)}$ is correction time of $P_2$ in the second cycle of node $P_1$ and node $P_2$; then, node $P_2$ uses the difference $\Delta T_2^{(P_1 P_2)}$ of the timestamps to adjust the local clock at time $T_{5,2}^{(P_2)}$ and adjusted time is represented by $T_{5,2}^{(P_2)*}$, and there is $T_{5,2}^{(P_2)*} = T_{5,2}^{(P_2)} + \Delta T_2^{(P_1 P_2)}$;

In the first synchronization cycle of node $P_1$ and node $P_2$, adjusted time of node $P_2$ at time $T_{5,1}^{(P_2)}$ is $T_{5,1}^{(P_2)*}$; in a period from time corresponding to this time $t_0$ corresponding time $T_{5,2}^{(P_2)}$, a real clock deviation $\Delta T_{true,2}^{(P_1 P_2)}$ of node $P_2$ compared with $P_1$ is:

$$\Delta T_{true,2}^{(P_1 P_2)} = \theta_{t1}^{(P_1 P_2)} + \rho^{(P_1 P_2)}(T_{5,2}^{(P_2)} - T_{5,1}^{(P_2)*}) \qquad (26)$$

From formulas (26)-(25), a clock offset $\theta t_{t2}^{(P_1 P_2)}$ of node $P_2$ after adjustment in the second synchronization cycle of node $P_1$ and node $P_2$ is:

$$\theta_{t2}^{(P_1 P_2)} = \Delta T_{true,2}^{(P_1 P_2)} - \Delta T_2^{(P_1 P_2)} = \qquad (27)$$
$$\rho^{(P_1 P_2)}(T_{5,2}^{(P_2)} - T_{1,2}^{(P_1)} - X_2^{(P_1 P_2)} - d^{(P_1 P_2)}) - X_2^{(P_1 P_2)} - \Delta T^{(AP_1)}_1$$

where $T_{1,2}^{(P_1)}$ is sending time when node $P_1$ sends a synchronization message to node $P_2$ in the second synchronization cycle between node $P_1$ and node $P_2$; $\Delta T_1^{(AP_1)}$ represents a difference of the receiving and sending timestamps between node A and node $P_1$ in the first synchronization cycle between node A and node $P_1$.

In a third synchronization cycle between node $P_1$ and node $P_2$, reference node $P_1$ needs to use a difference $\Delta T_1^{(AP_1)}$ of the receiving and sending timestamps of node A and node $P_1$ in the second synchronization cycle to correct an own local clock in each cycle, so for nodes $P_2$ and $P_1$, a difference $\Delta T_3^{(P_1 P_2)}$ of the receiving and sending timestamps in the third synchronization cycle between node $P_1$ and node $P_2$ is represented as:

$$T_{2,3}{}^{(P_2)} - T_{1,3}{}^{(P_1)} - d^{(P_1P_2)} + \Delta T_2^{(AP_1)} = \theta_{t2}{}^{(P_1P_2)} + \quad (28)$$
$$\rho^{(P_1P_2)}(T_{1,3}{}^{(P_1)} - T_{5,2}{}^{(P_2)*}) + X_3{}^{(P_1P_2)} + \rho^{(P_1P_2)}(d^{(P_1P_2)} + X_3{}^{(P_1P_2)})$$

$\theta_{t2}{}^{(P_1P_2)}$ and $T_{5,2}{}^{(P_2)}$ are substituted into formula (28) to obtain a difference $\Delta T_3{}^{(P_1P_2)}$ of receiving and sending timestamps between node $P_1$ and node $P_2$ in the third synchronization cycle of node $P_1$ and node $P_2$:

$$\Delta T_3^{(P_1P_2)} = T_{2,3}{}^{(P_2)} - T_{1,3}{}^{(P_1)} - d^{(P_1P_2)} = \quad (29)$$
$$\rho^{(P_1P_2)}(T_{1,3}{}^{(P_1)} - T_{2,2}{}^{(P_2)} - X_2{}^{(P_1P_2)} + X_3{}^{(P_1P_2)} + d^{(P_1P_2)}) - X_2{}^{(P_1P_2)} +$$
$$X_3{}^{(P_1P_2)} - [(T_{2,2}^{(P_1)} - T_{1,2}^{(A)} - d^{(AP_1)}) - (T_{2,1}^{(P_1)} - T_{1,1}^{(A)} - d^{(AP_1)})]$$

where $T_{2,2}{}^{(P_2)}$ represents receiving time when node $P_2$ receives time information sent by node $P_1$ in the second synchronization cycle between node $P_1$ and node $P_2$; $T_{2,2}{}^{(P_1)}$ represents receiving time when node $P_1$ receives time information sent by node A in the second synchronization cycle between node A and node $P_1$; $T_{1,2}{}^{(A)}$ represents sending time when node A sends a time message to node $P_1$ in the second synchronization cycle between node A and node $P_1$; $T_{2,1}{}^{(P_1)}$ represents receiving time when node $P_1$ receives time information sent by node A in the first synchronization cycle between node A and node $P_1$; $T_{1,1}{}^{(A)}$ represents sending time when node A sends a time message to node $P_1$ in the first synchronization cycle between node A and node $P_1$.

For the $i^{th}$ synchronization cycle between node $P_1$ and node $P_2$, reference node $P_1$ needs to use a difference $\Delta T_1{}^{(AP_1)}$ of the receiving and sending timestamps of node A and node $P_1$ in the $i^{th}$ synchronization cycle to correct an own local clock in each cycle, so for nodes $P_2$ and $P_1$, a difference $\Delta T_i{}^{(P_1P_2)}$ of the receiving and sending timestamps in the $i^{th}$ synchronization cycle is represented as:

$$\Delta T_i^{(P_1P_2)} = \quad (30)$$
$$\rho^{(P_1P_2)}(T_{1,i}{}^{(P_1)} - T_{2,i-1}{}^{(P_2)} - X_{i-1}{}^{(P_1P_2)} + X_i{}^{(P_1P_2)} + d^{(P_1P_2)}) -$$
$$X_{i-1}{}^{(P_1P_2)} + X_i{}^{(P_1P_2)} - [(T_{2,i-1}{}^{(P_1)} - T_{1,i-1}^{(A)}) -$$
$$\sum_{j=1}^{i}(T_{2,i-j-1}{}^{(P_1)} - T_{1,i-j-1}^{(A)})] + (i-3)d^{(P_1P_2)}$$
$$\epsilon_i = [(T_{2,i-1}{}^{(P_1)} - T_{1,i-1}^{(A)}) - \sum_{j=1}^{i}(T_{2,i-j-1}{}^{(P_1)} - T_{1,i-j-1}^{(A)})] +$$
$$(i-3)d^{(P_1P_2)} \text{ is set;}$$

where $T_{1,i}{}^{(P_1)}$ is represented as sending time when node $P_1$ sends a synchronization message to node $P_2$ in the $i^{th}$ synchronization cycle between node $P_1$ and node $P_2$; $T_{2,i-1}{}^{(P_2)}$ represents receiving time when node $P_2$ receives time information sent by node $P_1$ in an $i-1^{th}$ synchronization cycle between node $P_1$ and node $P_2$; $X_i{}^{(P_1P_2)}$ represents random time delay generated in a process of receiving and sending time information of the $i^{th}$ synchronization cycle between node $P_1$ and node $P_2$; $T_{2,i-1}{}^{(P_1)}$ represents receiving time when node $P_1$ receives time information sent by node A in the $i-1^{th}$ synchronization cycle between node A and node $P_1$; $T_{1,i-1}{}^{(A)}$ represents sending time when node A sends a time message to node $P_1$ in the $i-1^{th}$ synchronization cycle between node A and node $P_1$; $T_{2,i-j-1}{}^{(P_1)}$ represents sending time when node $P_1$ sends a synchronization message to node $P_2$ in an $i-j-1^{th}$ synchronization cycle between node $P_1$ and node $P_2$; $T_{1,i-j-1}{}^{(A)}$ represents sending time when node A sends a time message to node $P_1$ in the $i-j-1^{th}$ synchronization cycle between node A and node $P_1$.

Frequency offset $\rho^{(P_1P_2)}$ is estimated by using the maximum likelihood estimation method; and a log-likelihood function of formula (30) based on observed quantity $\{T_{2,i}{}^{(P_1)}, T_{1,i}{}^{(A)}, d^{(P_1P_2)}\}_{i=1}^{N}$ is represented as:

$$\ln L(\rho^{(P_1P_2)}, \delta^2) = \quad (31)$$
$$-\frac{N}{2}\ln(4\pi\delta^2) - \frac{1}{2\delta^2}\sum_{i=1}^{N}\left[\frac{(T_{2,i}{}^{(P_2)} - T_{1,i}{}^{(P_1)} - d^{(P_1P_2)}) - \rho^{(P_1P_2)}(T_{1,i}{}^{(P_1)} - T_{2,i-1}{}^{(P_2)} - d^{(P_1P_2)}) + \epsilon_i}{1 + \rho^{(P_1P_2)}}\right]^2$$

Partial derivatives of $\rho^{(P_1P_2)}$ on both sides of formula (31) are:

$$\frac{\partial \ln L(\rho^{(P_1P_2)}, \delta^2)}{\partial \rho^{(P_1P_2)}} = \frac{\sum_{i=1}^{N}\left[(T_{2,i}{}^{(P_2)} - T_{1,i}{}^{(P_1)} - d^{(P_1P_2)}) - \rho^{(P_1P_2)}(T_{1,i}{}^{(P_1)} - T_{2,i-1}{}^{(P_2)} - d^{(P_1P_2)}) + \epsilon_i\right]}{(1 + \rho^{(AP_1)})} \times \quad (32)$$
$$\frac{(T_{2,i-1}{}^{(P_2)} - T_{1,i}{}^{(P_1)} + d^{(P_1P_2)})(1 + \rho^{(P_1P_2)}) - [(T_{2,i}{}^{(P_2)} - T_{1,i}{}^{(P_1)} - d^{(P_1P_2)}) - \rho^{(P_1P_2)}(T_{1,i}{}^{(P_1)} - T_{2,i-1}{}^{(P_2)} - d^{(P_1P_2)}) + \epsilon_i]}{(1 + \rho^{(P_1P_2)})^2}$$

Formula (32) is made to be equal to 0, and a solution is:

$$\rho^{(P_1P_2)} = \frac{\sum_{i=1}^{N}\left[(T_{2,i}{}^{(P_2)} - T_{1,i}{}^{(P_1)} - d^{(P_1P_2)})(T_{2,i}{}^{(P_2)} - T_{2,i-1}{}^{(P_2)} - 2d^{(P_1P_2)} + 2\epsilon_i) - (T_{2,i-1}{}^{(P_2)} - T_{1,i}{}^{(P_1)} - d^{(P_1P_2)}) + \epsilon_i + \epsilon_i^2\right]}{\sum_{i=1}^{N}\left[(T_{2,i}{}^{(P_2)} - T_{1,i}{}^{(P_1)} - d^{(P_1P_2)})(T_{2,i-1}{}^{(P_2)} - 2T_{1,i}{}^{(P_1)} + T_{2,i}{}^{(P_2)}) + (T_{1,i}{}^{(P_1)} - T_{2,i-1}{}^{(P_2)} - d^{(P_1P_2)})(T_{2,i}{}^{(P_2)} - T_{2,i-1}{}^{(P_2)} + \epsilon_i)\right]}. \quad (33)$$

$P_2$ only needs to obtain parameters in formula (33) to estimate $\rho^{(P_1P_2)}$. By selecting appropriate $d^{(P_1P_2)}$ value, $\rho^{(P_1P_2)}$ can be adjusted so that frequencies of node $P_2$ and node $P_1$ are gradually close, to complete time synchronization of $P_2$ and $P_1$.

Further, in step S4, the node device of the industrial wireless network is used as the master clock, denoted as M; the terminal side conversion node is used as the slave clock, denoted as S; node S periodically sends ordinary data packets to node M; and synchronization information is transferred implicitly by controlling a response time interval $\Delta_i$ of a receiver for a sender;

In the $i^{th}$ cycle, sending node S sends an ordinary data packet to receiving node M at time $T_{1,i}{}^{(S)}$, and receiving node M receives the data packet at time $T_{2,i}{}^{(M)}$; after waiting for the response time interval $\Delta_i$, a response message is returned to sending node S at time $T_{3,i}{}^{(M)}$ and sending node S receives the response message at time $T_{4,i}{}^{(S)}$; then local receiving and sending time is recorded and stored in a local cache; with repeated processes of receiving and sending node data packets, the node can use the receiving and sending time of the local cache to estimate the clock frequency offset.

Further, number of time synchronizations in step S4 is set as N; there is A∈{2, 3, 4, ... N−1}; any of prime numbers P, Q and D is taken, where N=P*Q; when (D*E)mod ((P−1)*(Q−1))=1 is established, there is $C_i=(\Delta_i \text{ EXP } D) \text{mod } N$; where 1<i<N; $C_i$ is a generated random number; meanwhile, $C_i$ is used to represent a response time interval $\Delta_i$ that a receiving node needs to wait for in an $i^{th}$ synchronization process. It is noted that according to the principle of the RSA algorithm, although synchronization is conducted for N times, a response time interval $\Delta_i$ in N−2 synchronization processes can only be obtained. When N is large enough, N−2 times of synchronization and N times of synchronization can be regarded as the same.

$f_S$ and $f_M$ are set as crystal oscillator frequencies of node S and node M respectively, and a clock frequency offset $$\rho^{(MS)} = \frac{f_M}{f_S}$$

of node S relative to node M is defined;

In the first synchronization cycle, when node S sends an ordinary data packet to node M at time $T_{1,1}^{(S)}$, time $T_{2,1}^{(M)}$ when node M receives the data packet is represented as a formula below:

$$T_{2,1}^{(M)} = \rho^{(MS)} \times T_{1,1}^{(S)} + \theta_{t_0} + \rho^{(MS)} \times (d_1 + X_1) \qquad (34)$$

where $\theta_{t_0}$ represents an initial clock offset of node S relative to node M; $d_1$ represents fixed time delay generated in a process of receiving and sending the data packets; $X_1$ represents random time delay generated in the process of receiving and sending the data packets; Time $T_{3,1}^{(M)}$ when node M sends a response message can be obtained according to an RSA algorithm, i.e., $T_{3,1}^{(M)}=T_{2,1}^{(M)}+\Delta_2$; time when node S receives the response message sent by node M is denoted as $T_{4,1}^{(S)}$, then:

$$T_{3,1}^{(M)} = \rho^{(MS)} \times T_{4,1}^{(S)} + \theta_{t_0} - \rho^{(MS)} \times (d_2 + Y_1) \qquad (35)$$

where $d_2$ is fixed time delay of the response message in transmission, and $d_2=d_1−m$; here, the size of m is in direct proportion to a difference between length of uplink data packet messages and length of downlink response messages; $Y_1$ is downlink random time delay in the first synchronization cycle;

In the second synchronization cycle, node S sends an ordinary data packet to node M at time $T_{1,2}^{(S)}$ and node M receives the data packet at time $T_{2,2}^{(M)}$; a value of the response time interval $\Delta_2$ in the second synchronization cycle is obtained according to the RSA algorithm; at this moment, time when node M sends a response message is $T_{3,2}^{(M)}=T_{2,2}^{(M)}+\Delta_2$, and then:

$$T_{3,2}^{(M)} = \rho^{(MS)} \times T_{4,2}^{(S)} + \theta_{t_0} - \rho^{(MS)} \times (d_2 + Y_2) \qquad (36)$$

where $d_2$ is fixed time delay generated by the data packets in a process of receiving and sending the data packets in the second synchronization cycle; and $Y_2$ is downlink random time delay in the second synchronization cycle;

In the third synchronization cycle, node S sends an ordinary data packet to node M at time $T_{1,3}^{(S)}$, and node M receives the data packet at time $T_{2,3}^{(M)}$; a value of the response time interval $\Delta_3$ in the third synchronization cycle is obtained according to the RSA algorithm; at this moment, time when node M sends a response message is $T_{3,3}^{(M)}=T_{2,3}^{(M)}+\Delta_3$, and then:

$$T_{3,3}^{(M)} = \rho^{(MS)} \times T_{4,3}^{(S)} + \theta_{t_0} - \rho^{(MS)} \times (d_2 + Y_3) \qquad (37)$$

where $Y_3$ represents downlink random time delay in the third synchronization cycle;

In the $i^{th}$ synchronization cycle, node S sends an ordinary data packet to node M at time $T_{1,i}^{(S)}$, and node M receives the data packet at time $T_{2,i}^{(M)}$; a value of the response time interval $\Delta_i$ in the $i^{th}$ cycle can be obtained according to the RSA algorithm; at this moment, time when node M sends a response message is $T_{3,i}^{(M)}$; node S receives the response message returned by node M at time $T_{4,i}^{(S)}$. The following can be obtained:

$$T_{2,i}^{(M)} = \rho^{(MS)} \times T_{1,i}^{(S)} + \theta_{t_0} + \rho^{(MS)} \times (d_1 + X_i) \qquad (38)$$

$$T_{3,i}^{(M)} = \rho^{(MS)} \times T_{4,i}^{(S)} + \theta_{t_0} - \rho^{(MS)} \times (d_2 + Y_i) \qquad (39)$$

$$\Delta_i \in (\Delta_2, \Delta_3, \ldots, \Delta_{N-1}) \qquad (40)$$

$$T_{3,i}^{(M)} = T_{2,i}^{(M)} + \Delta_i \qquad (41)$$

where $X_i$ represents random time delay generated in the process of receiving and sending the data packets in the $i^{th}$ cycle; and Y represents downlink random time delay in the $i^{th}$ cycle.

After N−1 synchronization cycles, sending node S obtains a set of local timestamp pairs $\{T_{1,i}^{(S)}, T_{4,i}^{(S)}\}_{i=2}^{N-1}$, and receiving node M obtains a set of local timestamp pairs $\{T_{2,i}^{(M)}, T_{3,i}^{(M)}\}_{i=2}^{N-1}$; combined with the response time interval $\Delta_i$, the maximum likelihood estimation method is used to estimate frequency offset and fixed delay between nodes;

Formulas (39)-(38) are used to obtain:

$$T_{3,i}^{(M)} - T_{2,i}^{(M)} = \rho^{(MS)}[T_{4,i}^{(S)} - T_{1,i}^{(S)} - (d_1 + d_2) - (X_i + Y_i)] \qquad (42)$$

Because $X_i$ and $Y_i$ are Gaussian random distributions with mean of 0 and variance of $\sigma^2$ and $V_i=X_i+Y_i$ is made, $V_i$ is Gaussian random distribution with mean of 0 and variance of $2\sigma^2$ and $$\alpha = \frac{1}{\rho^{(MS)}}$$

is made; then formula (42) is simplified as:

$$\alpha(T_{3,i}^{(M)} - T_{2,i}^{(M)}) = (T_{4,i}^{(S)} - T_{1,i}^{(S)}) - 2d_1 + m - V_i \qquad (43)$$

where $T_{3,i}^{(M)} - T_{2,i}^{(M)} = \Delta_i$, and then formula (43) is expressed as a matrix form below:

$$\begin{bmatrix} T_{4,2} - T_{1,2} + m \\ T_{4,3} - T_{1,3} + m \\ \cdots \\ T_{4,N-1} - T_{1,N-1} + m \end{bmatrix} = \begin{bmatrix} T_{3,2} - T_{2,2} & 2 \\ T_{3,3} - T_{2,3} & 2 \\ \cdots & 2 \\ T_{3,N-1} - T_{2,N-1} & 2 \end{bmatrix} \begin{bmatrix} \alpha \\ d_1 \end{bmatrix} + \begin{bmatrix} V_2 \\ V_3 \\ \cdots \\ V_{N-1} \end{bmatrix} \quad (44)$$

A maximum likelihood function of formula (44) about parameters $(\alpha, d_1, \sigma^2)$ is expressed as:

$$L(\alpha, d_1 \sigma^2) = (2\pi \times 2\sigma^2)^{-\frac{N-1}{2}} \exp \left\{ -\frac{1}{2 \times 2\sigma^2} \sum_{i=2}^{i=N-1} \left[ (T_{4,i}^{(S)} - T_{1,i}^{(S)}) - \alpha \Delta_i - 2d_1 + m \right]^2 \right\} \quad (45)$$

Logarithms of both sides of formula (45) are calculated to obtain:

$$\ln L(\alpha, d_1 \sigma^2) = -\frac{N-1}{2} \ln(4\pi\sigma^2) - \frac{1}{4\sigma^2} \sum_{i=2}^{N-1} \left[ (T_{4,i}^{(S)} - T_{1,i}^{(S)}) - \alpha \Delta_i - 2d_1 + m \right]^2 \quad (46)$$

A first-order partial derivative about $\alpha$ for formula (46) is calculated to obtain:

$$\frac{\partial \ln L(\alpha, d_1, \sigma^2)}{\partial \alpha} = \frac{1}{2\sigma^2} \sum_{i=2}^{N-1} \left[ (T_{4,i}^{(S)} - T_{1,i}^{(S)} - \alpha \Delta_i - 2d_1 + m) \Delta_i \right] \quad (47)$$

A first-order partial derivative about $d_1$ for formula (46) is calculated to obtain:

$$\frac{\partial \ln L(\alpha, d_1, \sigma^2)}{\partial d_1} = \frac{1}{\sigma^2} \sum_{i=2}^{N-1} (T_{4,i}^{(S)} - T_{1,i}^{(S)} - \alpha \Delta_i - 2d_1 + m) \quad (48)$$

Formula (47) and formula (48) are made as 0, and maximum likelihood functions of $\rho^{(MS)}$ and $d_1$ can be obtained by simultaneous solution:

$$\rho^{(MS)} = \frac{1}{\alpha} = \frac{(N-2)\sum_{i=2}^{N-1} \Delta_i^2 - \left(\sum_{i=2}^{N-1} \Delta_i\right)^2}{(N-2)\sum_{i=2}^{N-1} \left[(T_{4,i}^{(S)} - T_{1,i}^{(S)} + m)\Delta_i\right] - \sum_{i=2}^{N-1} (T_{4,i}^{(S)} - T_{1,i}^{(S)} + m) \sum_{i=2}^{N-1} \Delta_i} \quad (49)$$

$$d_1 = \frac{\sum_{i=2}^{N-1} \Delta_i^2 \sum_{i=2}^{N-1} (T_{4,i}^{(S)} - T_{1,i}^{(S)} + m) - \sum_{i=2}^{N-1} \left[(T_{4,i}^{(S)} - T_{1,i}^{(S)} + m)\Delta_i\right] \sum_{i=2}^{N-1} \Delta_i}{2\left[(N-2)\sum_{i=2}^{N-1} \Delta_i^2 - \left(\sum_{i=2}^{N-1} \Delta_i\right)^2\right]} \quad (50)$$

Thus, the fixed time delay of the response message in transmission is $d_2 = d_1 - m$.

After the terminal side conversion node and the node device of the industrial wireless network complete synchronization, the TSN switch of the TSN 1 completes synchronization with the terminal side conversion node in the slave clock state, and a synchronization method is consistent with step S1.

The present invention has the following beneficial effects: in the method, the time synchronization information is extended from a two-level network to a three-level network in the wireless network; time adjustment of a first-level node after each synchronization cycle should consider the correction quantity of an upper-level node; in addition, the influence of fixed delay is added to the traditional correction quantity; and at the same time, it is not necessary to estimate frequency offset and clock offset jointly, but only needs to estimate the frequency offset separately, which can realize synchronization with multi-level nodes of the network, thereby reducing algorithm complexity while optimizing the correction quantity. At the same time, the present invention transfers the synchronization information level by level from the master clock of the convergence network to the slave clock through the industrial wireless network by means of multi-level forwarding of the time synchronization information, so as to complete the cross-network time synchronization between the industrial wireless network and the TSN.

Other advantages, objectives and features of the present invention will be illustrated in the following description to some extent, and will be apparent to those skilled in the art based on the following investigation and research to some extent, or can be taught from the practice of the present invention. The objectives and other advantages of the present invention can be realized and obtained through the following description.

DESCRIPTION OF THE DRAWINGS

To enable the purpose, the technical solution and the advantages of the present invention to be more clear, the present invention will be preferably described in detail below in combination with the drawings, wherein.

DETAILED DESCRIPTION OF THE INVENTION

Figure 1:
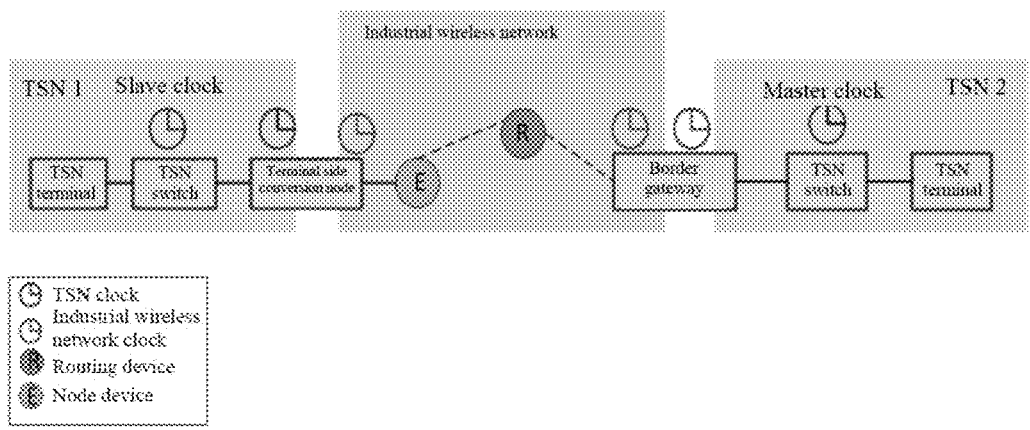
FIG. 1 is a cross-network architecture diagram of industrial wireless network and TSN fusion in the present invention.

Embodiments of the present invention are described below through specific embodiments. Those skilled in the art can understand other advantages and effects of the present invention easily through the disclosure of the description. The present invention can also be implemented or applied through additional different specific embodiments. All details in the description can be modified or changed based on different perspectives and applications without departing from the spirit of the present invention. It should be noted that the figures provided in the following embodiments only exemplarily explain the basic conception of the present invention, and if there is no conflict, the following embodiments and the features in the embodiments can be mutually combined.

Wherein the drawings are only used for exemplary description, are only schematic diagrams rather than physical diagrams, and shall not be understood as a limitation to the present invention. In order to better illustrate the embodiments of the present invention, some components in the drawings may be omitted, scaled up or scaled down, and do not reflect actual product sizes. It should be understandable for those skilled in the art that some well-known structures and description thereof in the drawings may be omitted.

Same or similar reference numerals in the drawings of the embodiments of the present invention refer to same or similar components. It should be understood in the description of the present invention that terms such as "upper", "lower", "left", "right", "front" and "back" indicate direction or position relationships shown based on the drawings, and are only intended to facilitate the description of the present invention and the simplification of the description rather than to indicate or imply that the indicated device or element must have a specific direction or constructed and operated in a specific direction, and therefore, the terms describing position relationships in the drawings are only used for exemplary description and shall not be understood as a limitation to the present invention; for those ordinary skilled in the art, the meanings of the above terms may be understood according to specific conditions.

With the continuous fusion and development of industrialization and informatization, in actual factory networks, most of the networks are formed by fusion of wired and wireless networks. In this heterogeneous network, the network requires devices between different networks to have strong time sequence constraint relationships during data fusion, energy management and deterministic scheduling. As shown in FIG. 1, the solution innovatively proposes a cross-network architecture for industrial wireless network and TSN fusion. The architecture conducts TSN processing for both ends of an industrial wireless network, and is comprised of two TSNs, an industrial wireless network, a border gateway and a terminal side conversion node, wherein the border gateway comprises an industrial wireless module and a TSN module. A TSN 1 and a TSN 2 use the same protocol, and the industrial wireless network and the two TSNs use different protocols.

The TSN comprises a TSN terminal and a TSN switch; the industrial wireless network may be a WIA-PA, a wireless sensor network, WirelessHART, 5G and other wireless communication networks; and the border gateway and the terminal side conversion node are used to convert protocols between the industrial wireless network and the TSN to play a role of communicating two networks.

Figure 2:
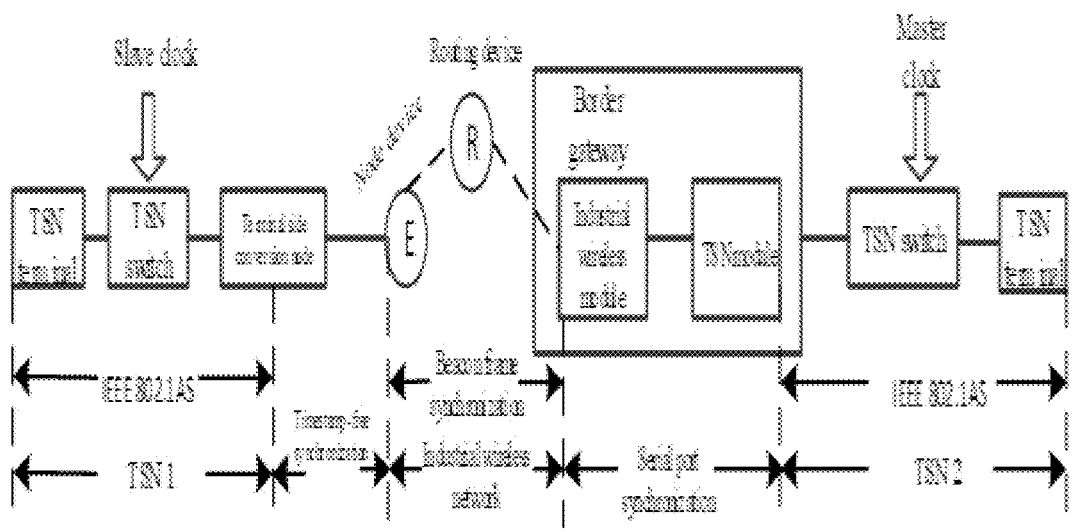
FIG. 2 is a schematic diagram of a cross-network time synchronization method.

Asymmetric delay in hybrid wireless and wired networks is one of the main reasons for inaccuracy of a synchronization process. Synchronization accuracy is affected by asymmetric delay, and the influence degree depends on the accuracy of calculated path delay. A schematic diagram of a cross-network time synchronization method in the solution is shown in FIG. 2.

The whole convergence network takes a TSN switch of the TSN 2 as a master clock and takes a TSN switch of the TSN 1 as a slave clock; the time information is forwarded from the TSN switch of the TSN 2 to the TSN switch of the TSN 1 through the border gateway, a routing device, a node device and the terminal side conversion node; and the master clock and the slave clock cross the industrial wireless network. The TSN and the industrial wireless network use the existing mature clock synchronization protocols such as IEEE 802.1AS and beacon frame synchronization to conduct synchronization, without introducing additional protocol overhead.

Firstly, a TSN module of a border gateway conducts clock synchronization with a TSN switch of a TSN 2 in a slave clock state; then, inside the border gateway, the TSN module is used as a master clock of an industrial wireless module, and the industrial wireless module conducts clock synchronization with the TSN module through a serial port so that time information is forwarded from a TSN 2 to an industrial wireless network.

Next, a routing device in the industrial wireless network conducts clock synchronization with the industrial wireless module of the border gateway through a beacon frame synchronization mode in the slave clock state, and the routing device is used as the master clock of a node device, to ensure clock synchronization of the industrial wireless network.

Finally, a terminal side conversion node conducts clock synchronization in the slave clock state with the node device in the industrial wireless network through a timestamp-free synchronization mode; independent of a special synchronization protocol, only the existing network data flow is followed to complete synchronization parameter estimation, to forward the time information from the industrial wireless network to the TSN 1; and then completing clock synchronization by the TSN switch of the TSN 1 with the terminal side conversion node in the slave clock state.

The synchronization information is transferred level by level from the master clock of the convergence network to the slave clock through the industrial wireless network by means of level-by-level forwarding of the time synchronization information, so as to complete the cross-network time synchronization between the industrial wireless network and the TSN.

Figure 3:
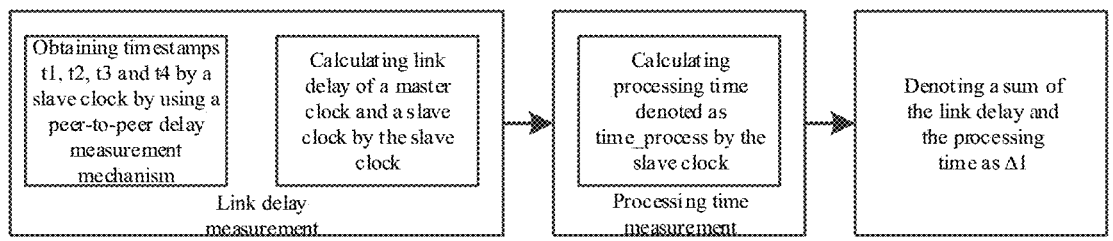
FIG. 3 is a flow chart of TSN synchronization.

In the synchronization process of TSN time, the TSN switch of the TSN 2 is used as the master clock and the TSN module in the border gateway is used as the slave clock. Considering that a wired network topology is relatively stable, link delay and processing time of the master clock and the slave clock are mainly considered in the synchronization process of TSN time, and the link delay is calculated according to IEEE 802.1AS. The flow chart of synchronization is shown in FIG. 3.

1) Link delay measurement. The link delay of the master clock and the slave clock is measured by a delay measurement mechanism shown in FIG. 4.

Figure 4:
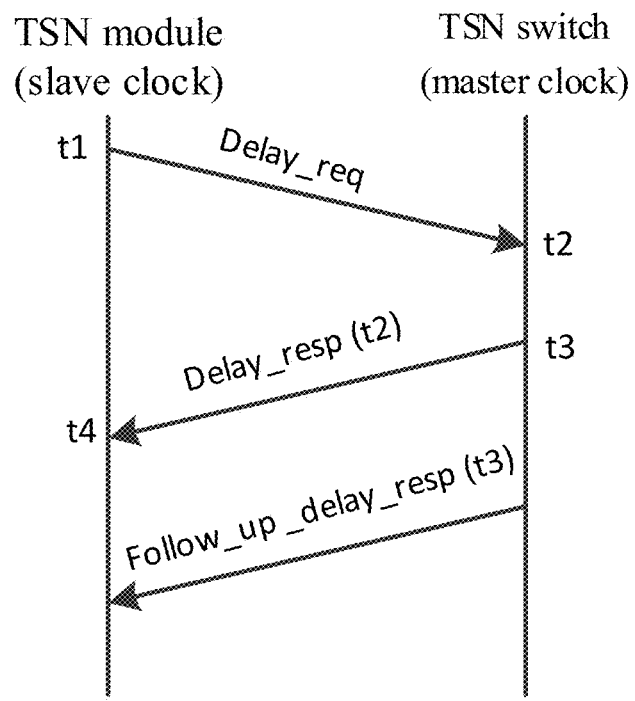
FIG. 4 is a diagram of a peer-to-peer delay measurement mechanism.

In FIG. 4, corresponding timestamps are obtained by exchanging a delay request message Delay_rep and a delay response message Delay_resp between the slave clock and the master clock; in the figure, Delay_resp(t2) represents that the delay response message replied to the slave clock at time t3 by the master clock carries time t2; Follow_up_delay_resp(t3) represents that a follow-up delay response message sent by the master clock to the slave clock carries time t3; after the follow-up delay response message Follow_up_delay_resp is sent, the slave clock receives the timestamps t1, t2, t3 and t4; and according to IEEE 802.1AS, the link delay delay_resp between the slave clock and the master clock is calculated as shown by expression (1):

$$\text{delay\_resp} = \frac{(t2 - t1) + (t4 - t3)}{2} \qquad (1)$$

2) Processing time measurement. Processing time is local time (which is duration time of a time interval between reception of a time synchronization event message by the master clock and transmission of a next subsequent time synchronization event message by the master clock). The processing time is denoted as time_process, which is t3 here.

Finally, the sum of the link delay and the processing time is denoted as Δ1=delay_resp+time_process.

Figure 5:
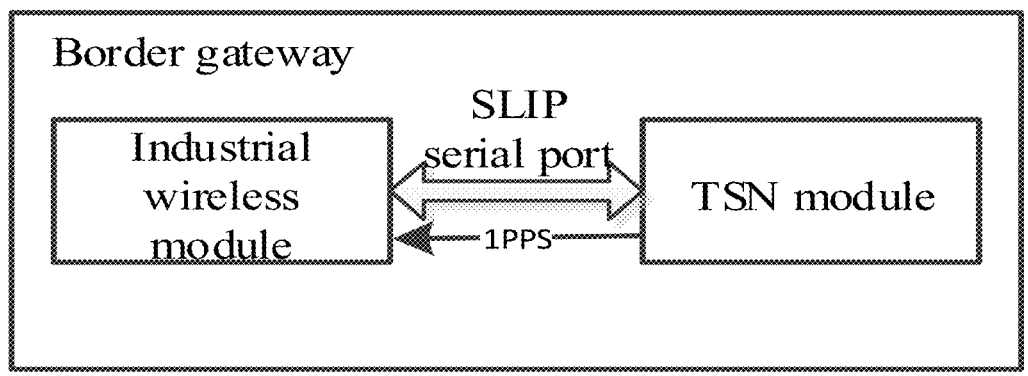
FIG. 5 is a structural schematic diagram of a border gateway.

The border gateway structure, as shown in FIG. 5, comprises an industrial wireless module and a TSN module. To support IP processing of non-IP networks such as WIA-PA, an SLIP is used in the solution to encapsulate IP data packets; and transparency of data transmission is ensured through an SLIP serial port, so that data is seamlessly connected between two networks.

The TSN module synchronizes to the master clock of the TSN 2 in a slave clock state, and then forwards the time synchronization information to the industrial wireless module through serial communication in a master clock state. Therefore, the time information is forwarded from the TSN 2 to the industrial wireless network.

A synchronization pulse signal outputted by a TSN module clock is a 1 PPS pulse, and the industrial wireless module adjusts own local time by detecting the synchronization pulse signal outputted by the TSN module clock.

For clock synchronization between two modules, firstly, the TSN module needs to send an own initial clock $T_0$ to the industrial wireless module through a serial port, and the industrial wireless module sets own local initial time local_time0 according to time; then, an interrupt program is started to begin to detect a 1 PPS pulse signal outputted by the TSN module; when detecting a 1 PPS signal, time of receiving the 1 PPS signal is denoted as local_time1; and subsequently, the own local clock is corrected once. Assuming that the industrial wireless module is corrected at time local_time2, corrected time local_time satisfies the following expression:

$$\text{local\_time0} = T_0 + S/R \quad (2)$$

$$\text{local\_time} = \text{local\_time2} + N - \text{local\_time1} \quad (3)$$

where S represents length of a serial port message; R represents a serial port baud rate; and N represents number of pulses received by the industrial wireless module.

The industrial wireless network can run protocols such as WIA-PA, ISA100.11a, 5G or WirelessHART. In the previous synchronization correction type algorithms, the clock is often adjusted only by calculating the frequency offset of the difference between the timestamps of a sender and a receiver, without considering an error influence caused by fixed time delay; or the influence of the fixed time delay is considered, but is only considered in a single-hop network. In order to further improve the correction accuracy of node clocks, the present invention estimates and compensates the frequency offset in a multi-hop network based on a synchronization mechanism of one-way message propagation, and adds the fixed time delay to the correction quantity. The synchronization process is as follows:

On this basis, the industrial wireless module synchronizes to the TSN 2 in a slave clock state according to the above method, and next, the industrial wireless module forwards the time synchronization information to the routing device and the node device in a master clock state.

Figure 6:
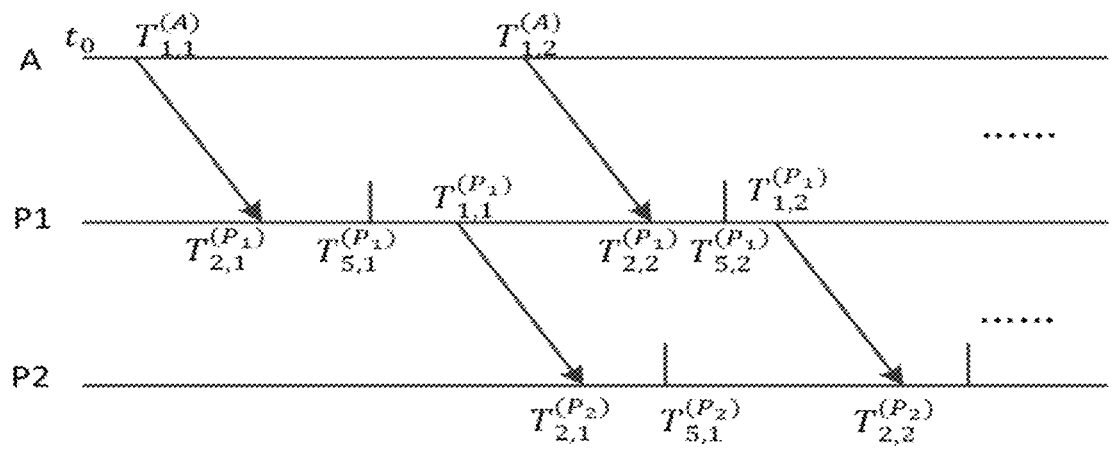
FIG. 6 is a flow chart of correction type time synchronization message interaction.

The whole industrial wireless network firstly takes the industrial wireless module in the border gateway as a reference node of clock synchronization; the industrial wireless module transfers the synchronization information to the routing device; the routing device adjusts the own local clock according to the information; then, the routing device serves as a reference node for the clock of the node device and forwards the synchronization information to the node device; and the node device adjusts the own local clock based on the time synchronization information. As shown in FIG. 6, the industrial wireless module is denoted as A, the routing device is denoted as $P_1$, and the node device is denoted as $P_2$.

Time when node A sends a time message to node $P_1$ to time when node $P_1$ receives the message is a synchronization cycle of interaction between node A and node $P_1$, and a process between node A and node $P_1$ is repeated for N times to generate N synchronization cycles; after each time two nodes conduct one-way interaction of time information (i.e., one synchronization cycle), node $P_1$ calculates clock frequency offset through the timestamp information for adjustment;

After adjustment of node $P_1$, a time message is sent to node $P_2$; time when node $P_1$ sends the time message to node $P_2$ to time when node $P_2$ receives the message is a synchronization cycle of interaction between node $P_1$ and node $P_2$; a process between node $P_1$ and node $P_2$ is repeated for N times to generate N synchronization cycles; after each time two nodes conduct one-way interaction of time information (i.e., one synchronization cycle), node $P_2$ calculates clock frequency offset through the timestamp information for adjustment.

1. Reference Node a and First-Layer Node $P_1$

In a first synchronization cycle, node A sends current time information $T_{1,1}^{(A)}$ to node $P_1$, and receiving time $T_{2,1}^{(P_1)}$ recorded by $P_1$ can be represented as:

$$T_{2,1}^{(P_1)} = T_{1,1}^{(A)} + \theta_{r0}^{(AP_1)} + \rho^{(AP_1)}(T_{1,1}^{(A)} - t_0) + \quad (4)$$
$$d^{(AP_1)} + X_1^{(AP_1)} + \rho^{(AP_1)}\left(d^{(AP_1)} + X_1^{(AP_1)}\right)$$

In a formula, $\theta_{r0}^{(P_1)}$ represents an initial clock offset of node $P_1$ relative to reference node A at time $t_0$; $\rho^{(AP_1)}$ represents a clock frequency offset of node $P_1$ relative to reference node A; $d^{(AP_1)}$ represents fixed time delay generated in a process of receiving and sending time information, with a value range of 1 ms-10 ms. $X^{(AP_1)}$ represents random time delay generated in the process of receiving and sending time information; $\rho^{(AP_1)}(d^{(AP_1)}+X^{(AP_1)})$ represents a synchronization error accumulated due to frequency offset in the process of receiving and sending time information.

Further, in the first synchronization cycle, a difference $\Delta T_1^{(AP_1)}$ of receiving and sending timestamps between node A and node $P_1$ to be synchronized is represented as:

$$\Delta T_1^{(AP_1)} = T_{2,1}^{(P_1)} - T_{1,1}^{(A)} - d^{(AP_1)} = \quad (5)$$
$$\theta_{r0}^{(AP_1)} + \rho^{(AP_1)}(T_{1,1}^{(A)} - t_0) + X_1^{(AP_1)} + \rho^{(AP_1)}\left(d^{(AP_1)} + X_1^{(AP_1)}\right)$$

$T_{5,1}^{(P_1)}$ is correction time of $P_1$ in the first synchronization cycle. Node $P_1$ uses the difference $\Delta T_1^{(AP_1)}$ to adjust the own local clock at time $T_{5,1}^{(P_1)}$ and time adjusted by $P_1$ is represented by $T_{5,1}^{(P_1)*}$, and there is $$T_{5,1}^{(P_1)*} = T_{5,1}^{(P_1)} + \Delta T_1^{(AP_1)} = T_{5,1}^{(P_1)} + T_{2,1}^{(P_1)} - T_{1,1}^{(A)} - d^{(AP_1)} \quad (6)$$

In a period from initial time $t_0$ to the correction time $T_{5,1}^{(P_1)}$, a real clock deviation $\Delta T_{true,1}^{(AP_1)}$ between node A and node $P_1$ is:

$$\Delta T_{true,1}^{(AP_1)} = \theta_{t0}^{(AP_1)} + \rho^{(AP_1)}(T_{5,1}^{(P_1)} - t_0) \quad (7)$$

From formulas (7)-(5), a new clock offset $\theta_{t1}^{(AP_1)}$ of node $P_1$ after adjustment is obtained as:

$$\theta_{t1}^{(AP_1)} = \quad (8)$$
$$\Delta T_{true,1}^{(AP_1)} - \Delta T_1^{(AP_1)} = \rho^{(AP_1)}\left(T_{5,1}^{(P_1)} - T_{1,1}^{(A)} - d^{(AP_1)} - X_1^{(AP_1)}\right) - X_1^{(AP_1)}$$

In a second synchronization cycle, node A sends current time information $T_{1,2}^{(A)}$ to node $P_1$. In the second synchronization cycle, receiving time $T_{2,2}^{(P_1)}$ recorded by node $P_1$ is represented as:

$$T_{2,2}^{(P_1)} = T_{1,2}^{(A)} + \theta_{t1}^{(AP_1)} + \rho^{(AP_1)}\left(T_{1,2}^{(A)} - T_{5,1}^{(P_1)*}\right) + \quad (9)$$
$$d^{(AP_1)} + X_2^{(AP_1)} + \rho^{(AP_1)}\left(d^{(AP_1)} + X_2^{(AP_1)}\right)$$

where $X_2^{(AP_1)}$ is random time delay generated in a process of receiving and sending time information of the second synchronization cycle.

Further, in the second synchronization cycle, a difference $\Delta T_2^{AP_1}$ of receiving and sending timestamps between reference node A and node $P_1$ can be represented as:

$$\Delta T_2^{(AP_1)} = T_{2,2}^{(P_1)} - T_{1,2}^{(A)} - d^{(AP_1)} = \quad (10)$$
$$\theta_{t1}^{(AP_1)} + \rho^{(AP_1)}\left(T_{1,2}^{(A)} - T_{5,1}^{(P_1)*}\right) + X_2^{(AP_1)} + \rho^{(AP_1)}\left(d^{(AP_1)} + X_2^{(AP_1)}\right)$$

Time of $P_1$ after adjustment in the first synchronization cycle is set as $T_{5,1}^{(P_1)*}$ and time of node A, corresponding to the time, is $T_{5,1}^{(A)*}$; at this moment, because node $P_1$ just adjusts local time and time of node A is close to time of node $P_1$, $T_{5,1}^{(P_1)*}=T_{5,1}^{(A)*}$ is set; formula (10) is changed as:

$$\Delta T_2^{(AP_1)} = \quad (11)$$
$$\theta_{t1}^{(AP_1)} + \rho^{(AP_1)}\left(T_{1,2}^{(A)} - T_{5,1}^{(A)*}\right) + X_2^{(AP_1)} + \rho^{(AP_1)}\left(d^{(AP_1)} + X_2^{(AP_1)}\right)$$

$\theta_{t1}^{(AP_1)}$ and $T_{5,1}^{(A)*}$ are substituted into formula (11) to obtain:

$$\Delta T_2^{(AP_1)} = \quad (12)$$
$$\rho^{(AP_1)}\left(T_{1,2}^{(A)} - X_1^{(AP_1)} + X_2^{(AP_1)} - T_{2,1}^{(P_1)} + d^{(AP_1)}\right) - X_1^{(AP_1)} + X_2^{(AP_1)}$$

In a period from $T_{5,1}^{(P_1)*}$ to $T_{5,2}^{(P_1)}$ (i.e., in the second synchronization cycle), a real clock deviation $\Delta T_{true,2}^{(AP_1)}$ between node A and node $P_1$ is:

$$\Delta T_{true,2}^{(AP_1)} = \theta_{t1}^{(AP_1)} + \rho^{(AP_1)}\left(T_{5,2}^{(P_1)} - T_{5,1}^{(P_1)*}\right) \quad (13)$$

where $T_{5,2}^{(P_1)}$ is correction time of $P_1$ in the second synchronization cycle. From formulas (13)-(12), a new clock offset $\theta_{t2}^{(AP_1)}$ of node $P_1$ after second adjustment can be obtained as:

$$\theta_{t2}^{(AP_1)} = \quad (14)$$
$$\Delta T_{true,2}^{(AP_1)} - \Delta T_2^{(AP_1)} = \rho^{(AP)}\left(T_{5,2}^{(P_1)} - T_{1,2}^{(A)} - d^{(AP_1)} - X_2^{(AP_1)}\right) - X_2^{(AP_1)}$$

Similarly, in an $i^{th}$ synchronization cycle, a difference $\Delta T_i^{(AP_1)}$ of receiving and sending timestamps between reference node A and node $P_1$ can be obtained as:

$$\Delta T_i^{(AP_1)} = \quad (15)$$
$$\rho^{(AP_1)}\left(T_{1,i}^{(A)} - X_{i-1}^{(AP_1)} + X_2^{(AP_1)} - T_{2,i-1}^{(P_1)} + d^{(AP_1)}\right) - X_{i-1}^{(AP_1)} + X_i^{(AP_1)}$$

where $X_i^{(AP_1)}$ is random time delay generated in a process of receiving and sending time information of the $i^{th}$ cycle.

A new clock offset $\theta_{ti}^{(AP_1)}$ of node $P_1$ after $i^{th}$ adjustment is:

$$\theta_{ti}^{(AP_1)} = \quad (16)$$
$$\Delta T_{true,i}^{(AP_1)} - \Delta T_i^{(AP_1)} = \rho^{(AP_1)}\left(T_{5,i}^{(P_1)} - T_{1,i}^{(A)} - d^{(AP_1)} - X_i^{(AP_1)}\right) - X_i^{(AP_1)}$$

Table 1 provides main parameters in the process of node clock synchronization, including reference time, initial offset, correction time and correction quantity.

TABLE 1

Main Parameters in Clock Synchronization

| Cycle | 1 | 2 | 3 | ... i | i + 1 |
|---|---|---|---|---|---|
| Reference time | $t_0$ | $T_{5,1}^{(A)*}$ | $T_{5,2}^{(A)*}$ | ... $T_{5,i-1}^{(A)*}$ | $T_{5,i}^{(A)*}$ |
| A sending time | $T_{1,1}^{(A)}$ | $T_{1,2}^{(A)}$ | $T_{1,3}^{(A)}$ | ... $T_{1,i}^{(A)}$ | $T_{1,i+1}^{(A)}$ |
| $P_1$ receiving time | $T_{2,1}^{(P_1)}$ | $T_{2,2}^{(P_1)}$ | $T_{2,3}^{(P_1)}$ | ... $T_{2,i}^{(P_1)}$ | $T_{2,i+1}^{(P_1)}$ |
| $P_2$ receiving time | $T_{2,1}^{(P_2)}$ | $T_{2,2}^{(P_2)}$ | $T_{2,3}^{(P_2)}$ | ... $T_{2,i}^{(P_2)}$ | $T_{2,i+1}^{(P_2)}$ |
| Initial offset | $\theta_{t0}^{(AP_1)}$ | $\theta_{t1}^{(AP_1)}$ | $\theta_{t2}^{(AP_1)}$ | ... $\theta_{ti-1}^{(AP_1)}$ | $\theta_{ti}^{(AP_1)}$ |
| $P_1$ correction time | $T_{5,1}^{(P_1)}$ | $T_{5,2}^{(P_1)}$ | $T_{5,3}^{(P_1)}$ | ... $T_{5,i-1}^{(P_1)}$ | $T_{5,i}^{(P_1)}$ |
| $P_1$ correction quantity | $\Delta T_1^{(AP_1)}$ | $\Delta T_2^{(AP_1)}$ | $\Delta T_3^{(AP_1)}$ | ... $\Delta T_{i-1}^{(AP_1)}$ | $\Delta T_i^{(AP_1)}$ |
| Random time delay | $X_1^{(AP_1)}$ | $X_2^{(AP_1)}$ | $X_3^{(AP_1)}$ | ... $X_i^{(AP_1)}$ | $X_{i+1}^{(AP_1)}$ |

To simplify calculation, formula (15) can be transformed into the following expression:

$$\Delta T_i^{(AP_1)} = \rho^{(AP_1)}\left(T_{1,i}^{(A)} - T_{2,i-1}^{(P_1)} - d^{(AP_1)}\right) + \left(1 + \rho^{(AP_1)}\right)\left(X_i^{(AP_1)} - X_{i-1}^{(AP_1)}\right) \quad (17)$$

$Q_i = X_i^{(AP_1)} - X_{i-1}^{(AP_1)}$ is made; because random time delay $X_i^{(AP_1)}$ and $X_{i-1}^{(AP_1)}$ can be regarded as random variables which have the same average and obey Gaussian distribution, it is easy to know that $Q_i$ is also a random variable which obeys Gaussian distribution, i.e., $Q_i \sim (0,\delta^2)$; frequency offset $\rho^{(AP_1)}$ is estimated by using a maximum likelihood estimation method; and a log-likelihood function of formula (17) based on observed quantity $\{T_{2,i}^{(P_1)}, T_{1,i}^{(A)}, d^{(AP_1)}\}_{i=1}^{N}$ is represented as:

$$\ln^{L(\rho^{(AP_1)},\delta^2)} = \\ -\frac{N}{2}\ln(2\pi\delta^2) - \frac{1}{2\delta^2}\sum_{i=1}^{N}\left[\frac{T_{2,i}^{(P_1)} - T_{1,i}^{(A)} - d^{(AP_1)} - \rho^{(AP_1)}(T_{1,i}^{(A)} - T_{2,i-1}^{(P_1)})}{1+\rho^{(AP_1)}}\right]^2 \quad (18)$$

A partial derivative of $\rho^{(AP_1)}$ is calculated and made as 0:

$$\frac{\partial \ln^{L(\rho^{(AP_1)},\delta^2)}}{\partial \rho^{(AP_1)}} = \frac{\sum_{i=1}^{N}[(T_{2,i}^{(P_1)} - T_{1,i}^{(A)} - d^{(AP_1)} - \rho^{(AP_1)}}{(1+\rho^{(AP_1)})^3} \\ \frac{(T_{1,i}^{(A)} - T_{2,i-1}^{(P_1)}))(T_{2,i}^{(P_1)} - T_{2,i-1}^{(P_1)} - d^{(AP_1)})]}{(1+\rho^{(AP_1)})^3} \\ = 0$$

A solution is obtained as:

$$\rho^{(AP_1)} = \frac{\sum_{i=1}^{N}(T_{2,i}^{(P_1)} - \tau_{1,i}^{(A)} - d^{(AP_1)})(T_{2,i}^{(P_1)} - \tau_{2,i-1}^{(P_1)} - d^{(AP_1)})}{\sum_{i=1}^{N}(T_{1,i}^{(A)} - T_{2,i-1}^{(P_1)})(T_{2,i}^{(P_1)} - T_{2,i-1}^{(P_1)} - d^{(AP_1)})} \quad (19)$$

$P_1$ only needs to obtain parameters in formula (19) to estimate $\rho^{(AP_1)}$. By selecting appropriate $d^{(AP_1)}$ value, $\rho^{(AP_1)}$ can be adjusted so that frequencies of node $P_1$ and node A are gradually close, to complete time synchronization of $P_1$ and A.

2. First-Layer Node $P_1$ and Second-Layer Node $P_2$

After node $P_1$ receives the time information from reference node A, a reference node as node $P_2$ after adjustment of an own local clock is calculated according to timestamps. Similarly, node $P_2$ uses node $P_1$ as the reference node, and node $P_1$ sends the time information to node $P_2$.

In the first synchronization cycle between node $P_1$ and node $P_2$, node $P_1$ sends current time information $T_{1,1}^{(P_1)}$ to node $P_2$, and time when node $P_2$ receives the time information sent by node $P_1$ is denoted as $T_{2,1}^{(P_2)}$, which can be represented as:

$$T_{2,1}^{(P_2)} = T_{1,1}^{(P_1)} + \theta_{t0}^{(P_1P_2)} + \rho^{(P_1P_2)}(T_{1,1}^{(P_1)} - t_0) + \\ d^{(P_1P_2)} + X_1^{(P_1P_2)} + \rho^{(P_1P_2)}(d^{(P_1P_2)} + X_1^{(P_1P_2)}) \quad (20)$$

In a formula, $\theta_{t0}^{(P_1P_2)}$ represents an initial clock offset of node $P_2$ at time $t_0$ relative to reference node $P_1$; $\rho^{(P_1P_2)}$ represents a clock frequency offset of node $P_2$ relative to reference node $P_1$; $d^{(P_1P_2)}$ represents fixed time delay generated in a process of receiving and sending time information, with a value range of 1 ms-10 ms. $X_1^{(P_1P_2)}$ represents random time delay generated in the process of receiving and sending time information; $\rho^{(P_1P_2)}(d^{(P_1P_2)}+X_1^{(P_1P_2)})$ represents a synchronization error accumulated due to frequency offset in the process of receiving and sending time information.

Further, in the first synchronization cycle of node $P_1$ and node $P_2$, a difference $\Delta T_1^{(P_1P_2)}$ of receiving and sending timestamps between node $P_1$ and node $P_2$ can be obtained:

$$\Delta T_1^{(P_1P_2)} = T_{2,1}^{(P_2)} - T_{1,1}^{(P_1)} - d^{(P_1P_2)} = \\ \theta_{t0}^{(P_1P_2)} + \rho^{(P_1P_2)}(T_{1,1}^{(P_1)} - t_0) + X_1^{(P_1P_2)} + \rho^{(P_1P_2)}(d^{(P_1P_2)} + X_1^{(P_1P_2)}) \quad (21)$$

$T_{5,1}^{(P_2)}$ is correction time of $P_2$ in the first synchronization cycle. Then, node $P_2$ uses the difference $\Delta T_1^{(P_1P_2)}$ of the timestamps to adjust the local clock at time $T_{5,1}^{(P_2)}$ and adjusted local time is represented by $T_{5,1}^{(P_2)*}$, and there is $T_{5,1}^{(P_2)*} = T_{5,1}^{(P_2)} + \Delta T_1^{(P_2)}$.

In a period from the initial time to the correction time, a real clock deviation $\Delta T_{true,1}^{(P_2)}$ between node $P_1$ and node $P_2$ is:

$$\Delta T_{true,1}^{(P_1P_2)} = \theta_{t0}^{(P_1P_2)} + \rho^{(P_1P_2)}(T_{5,1}^{(P_2)} - t_0) \quad (22)$$

From formulas (22)-(21), a new clock offset $\theta_{t1}^{(P_1P_2)}$ of node $P_2$ after adjustment in the first synchronization cycle of node $P_1$ and node $P_2$ is:

$$\theta_{t1}^{(P_1P_2)} = \Delta T_{true,1}^{(P_1P_2)} - \Delta T_1^{(P_1P_2)} = \\ \rho^{(P_1P_2)}(T_{5,1}^{(P_2)} - T_{1,1}^{(P_1)} - d^{(P_1P_2)} - X_1^{(P_1P_2)}) - X_1^{(P_1P_2)} \quad (23)$$

In the second synchronization cycle, reference node $P_1$ needs to use a difference $\Delta T_1^{(AP_1)}$ of the receiving and sending timestamps of node A and node $P_1$ in the first synchronization cycle to correct an own local clock in each cycle, so for nodes $P_2$ and $P_1$, a difference $\Delta T_2^{(P_1P_2)}$ of the receiving and sending timestamps of node $P_1$ and node $P_2$ in the second synchronization cycle can be represented as:

$$T_{2,2}^{(P_2)} - T_{1,2}^{(P_1)} - d^{(P_1P_2)} + \Delta T_1^{(AP_1)} = \theta_{t1}^{(P_1P_2)} + \\ \rho^{(P_1P_2)}(T_{1,2}^{(P_1)} - T_{5,1}^{(P_2)*}) + X_2^{(P_1P_2)} + \rho^{(P_1P_2)}(d^{(P_1P_2)} + X_2^{(P_1P_2)}) \quad (24)$$

where $T_{1,2}^{(P_1)}$ is sending time when node $P_1$ sends a synchronization message to node $P_2$ in the second synchronization cycle between node $P_1$ and node $P_2$; $T_{2,2}^{(P_2)}$ is receiving time when node $P_2$ receives the synchronization message in the second synchronization cycle between node $P_1$ and node $P_2$; $X_2^{(P_1P_2)}$ is random time delay generated in a process of receiving and sending time information of the second synchronization cycle between node $P_1$ and node $P_2$; $\theta_{t1}^{(P_1P_2)}$ and $T_{5,1}^{(P_2)*}$ are substituted into formula (24) to obtain a difference $\Delta T_1^{(P_1P_2)}$ of receiving and sending timestamps between node $P_1$ and node $P_2$ in the second synchronization cycle of node $P_1$ and node $P_2$:

$$\Delta T_2^{(P_1P_2)} = T_{2,2}^{(P_2)} - T_{1,2}^{(P_1)} - d^{(P_1P_2)} = \\ \rho^{(P_1P_2)}(T_{1,2}^{(P_1)} - T_{2,1}^{(P_2)} - X_1^{(P_1P_2)} + X_2^{(P_1P_2)} + d^{(P_1P_2)}) - X_1^{(P_1P_2)} + \\ X_2^{(P_1P_2)} - (T_{2,1}^{(P_1)} - T_{1,1}^{(A)} - d^{(AP_1)}) \quad (25)$$

where $T_{2,1}^{(P_2)}$ represents receiving time when node $P_2$ receives time information sent by node $P_1$ in the first synchronization cycle between node $P_1$ and node $P_2$; $T_{2,1}^{(P_1)}$ represents receiving time when node $P_1$ receives time information sent by node A in the first synchronization cycle between node A and node $P_1$; $T_{1,1}^{(A)}$ represents sending time when node A sends a time message to node $P_1$ in the first synchronization cycle between node A and node $P_1$.

$T_{5,2}^{(P_2)}$ is correction time of $P_2$ in the second synchronization cycle. Then, node $P_2$ uses the difference $\Delta T_2^{(P_1P_2)}$ of the timestamps to adjust the local clock at time $T_{5,2}^{(P_2)}$ and adjusted time is represented by $T_{5,2}^{(P_2)*}$, and there is $T_{5,2}^{(P_2)*}=T_{5,2}^{(P_2)}+\Delta T_2^{(P_1P_2)}$.

In the first synchronization cycle of node $P_1$ and node $P_2$, adjusted time of node $P_2$ at time $T_{5,1}^{(P_2)}$ is $T_{5,1}^{(P_2)*}$; in a period from time corresponding to this time $t_0$ corresponding time $T_{5,2}^{(P_2)}$, a real clock deviation $\Delta T_{true,2}^{(P_1P_2)}$ of node $P_2$ compared with $P_1$ is:

$$\Delta T_{true,2}^{(P_1P_2)} = \theta_{t1}^{(P_1P_2)} + \rho^{(P_1P_2)}\left(T_{5,2}^{(P_2)} - T_{5,1}^{(P_2)*}\right) \quad (26)$$

From formulas (26)-(25), a clock offset $\theta_{t2}^{(P_1P_2)}$ of node $P_2$ after adjustment in the second synchronization cycle of node $P_1$ and node $P_2$ is:

$$\theta_{t2}^{(P_1P_2)} = \quad (27)$$
$$\Delta T_{true,2}^{(P_1P_2)} - \Delta T_2^{(P_1P_2)} = \rho^{(P_1P_2)}\left(T_{5,2}^{(P_2)} - T_{1,2}^{(P_1)} - X_2^{(P_1P_2)} - d^{(P_1P_2)}\right) -$$
$$X_2^{(P_1P_2)} + \Delta T_1^{(AP_1)}$$

where $T_{1,2}^{(P_1)}$ is sending time when node $P_1$ sends a synchronization message to node $P_2$ in the second synchronization cycle between node $P_1$ and node $P_2$; $\Delta T_1^{(AP_1)}$ represents a difference of the receiving and sending timestamps between node A and node $P_1$ in the first synchronization cycle between node A and node $P_1$.

In a third synchronization cycle between node $P_1$ and node $P_2$, reference node $P_1$ needs to use a difference $\Delta T_1^{(AP_1)}$ of the receiving and sending timestamps of node A and node $P_1$ in the second synchronization cycle to correct an own local clock in each cycle, so for nodes $P_2$ and $P_1$, a difference $\Delta T_3^{(P_1P_2)}$ of the receiving and sending timestamps in the third synchronization cycle between node $P_1$ and node $P_2$ is represented as:

$$T_{2,3}^{(P_2)} - T_{1,3}^{(P_1)} - d^{(P_1P_2)} + \Delta T_2^{(AP_1)} = \theta_{t2}^{(P_1P_2)} + \quad (28)$$
$$\rho^{(P_1P_2)}\left(T_{1,3}^{(P_1)} - T_{5,2}^{(P_2)*}\right) + X_3^{(P_1P_2)} + \rho^{(P_1P_2)}\left(d^{(P_1P_2)} + X_3^{(P_1P_2)}\right)$$

where $T_{1,3}^{(P_1)}$ is sending time when node $P_1$ sends a synchronization message to node $P_2$ in the third synchronization cycle between node $P_1$ and node $P_2$; $T_{2,3}^{(P_2)}$ is receiving time when node $P_2$ receives the synchronization message in the third synchronization cycle between node $P_1$ and node $P_2$; $X_3^{(P_1P_2)}$ is random time delay generated in a process of receiving and sending time information of the third synchronization cycle between node $P_1$ and node $P_2$;

$\theta_{t2}^{(P_1P_2)}$ and $T_{5,2}^{(P_2)}$ are substituted into formula (28) to obtain a difference $\Delta T_3^{(P_1P_2)}$ of receiving and sending timestamps between node $P_1$ and node $P_2$ in the third synchronization cycle of node $P_1$ and node $P_2$:

$$\Delta T_3^{(P_1P_2)} = T_{2,3}^{(P_2)} - T_{1,3}^{(P_1)} - d^{(P_1P_2)} = \quad (29)$$
$$\rho^{(P_1P_2)}\left(T_{1,3}^{(P_1)} - T_{2,2}^{(P_2)} - X_2^{(P_1P_2)} + X_3^{(P_1P_2)} + d^{(P_1P_2)}\right) - X_2^{(P_1P_2)} +$$
$$X_3^{(P_1P_2)} - \left[\left(T_{2,2}^{(P_1)} - T_{1,2}^{(A)} - d^{(AP_1)}\right) - \left(T_{2,1}^{(P_1)} - T_{1,1}^{(A)} - d^{(AP_1)}\right)\right]$$

where $T_{2,2}^{(P_2)}$ represents receiving time when node $P_2$ receives time information sent by node $P_1$ in the second synchronization cycle between node $P_1$ and node $P_2$; $T_{2,2}^{(P_1)}$ represents receiving time when node $P_1$ receives time information sent by node A in the second synchronization cycle between node A and node $P_1$; $T_{1,2}^{(A)}$ represents sending time when node A sends a time message to node $P_1$ in the second synchronization cycle between node A and node $P_1$; $T_{2,1}^{(P_1)}$ represents receiving time when node $P_1$ receives time information sent by node A in the first synchronization cycle between node A and node $P_1$; $T_{1,1}^{(A)}$ represents sending time when node A sends a time message to node $P_1$ in the first synchronization cycle between node A and node $P_1$.

Similarly, for the $i^{th}$ synchronization cycle between node $P_1$ and node $P_2$, reference node $P_1$ needs to use a difference $\Delta T_i^{(AP_1)}$ of the receiving and sending timestamps of node A and node $P_1$ in the $i^{th}$ synchronization cycle to correct an own local clock in each cycle, so for nodes $P_2$ and $P_1$, a difference $\Delta T_i^{(P_1P_2)}$ of the receiving and sending timestamps in the $i^{th}$ synchronization cycle of node $P_1$ and node $P_2$ can be represented as:

$$\Delta T_i^{(P_1P_2)} = \rho^{(P_1P_2)}\left(T_{1,i}^{(P_1)} - T_{2,i-1}^{(P_2)} - X_{i-1}^{(P_1P_2)} + \right. \quad (30)$$
$$\left. X_i^{(P_1P_2)} + d^{(P_1P_2)}\right) - X_{i-1}^{(P_1P_2)} + X_i^{(P_1P_2)} - \left[\left(T_{2,i-1}^{(P_1)} - T_{1,i-1}^{(A)}\right) - \right.$$
$$\left. \sum\nolimits_{j=1}^{i}\left(T_{2,i-j-1}^{(P_1)} - T_{1,i-j-1}^{(A)}\right)\right] - (i-3)d^{(P_1P_2)}$$
$$\epsilon_i = \left[\left(T_{2,i-1}^{(P_1)} - T_{1,i-1}^{(A)}\right) - \sum\nolimits_{j=1}^{i}\left(T_{2,i-j-1}^{(P_1)} - T_{1,i-j-1}^{(A)}\right)\right] + (i-3)d^{(P_1P_2)} \text{ is set;}$$

where $T_{1,i}^{(P_1)}$ is represented as sending time when node $P_1$ sends a synchronization message to node $P_2$ in the $i^{th}$ synchronization cycle between node $P_1$ and node $P_2$; $T_{2,i-1}^{(P_2)}$ represents receiving time when node $P_2$ receives time information sent by node $P_1$ in an $i-1^{th}$ synchronization cycle between node $P_1$ and node $P_2$; $X_i^{(P_1P_2)}$ represents random time delay generated in a process of receiving and sending time information of the $i^{th}$ synchronization cycle between node $P_1$ and node $P_2$; $T_{2,i-1}^{(P_1)}$ represents receiving time when node $P_1$ receives time information sent by node A in the $i-1^{th}$ synchronization cycle between node A and node $P_1$; $T_{1,i-1}^{(A)}$ represents sending time when node A sends a time message to node $P_1$ in the $i-1^{th}$ synchronization cycle between node A and node $P_1$; $T_{2,i-j-1}^{(P_1)}$ represents sending time when node $P_1$ sends a synchronization message to node $P_2$ in an $i-j-1^{th}$ synchronization cycle between node $P_1$ and node $P_2$; $T_{1,i-j-1}^{(A)}$ represents sending time when node A sends a time message to node $P_1$ in the $i-j-1^{th}$ synchronization cycle between node A and node $P_1$.

Frequency offset $\rho^{(P_1P_2)}$ is estimated by using the maximum likelihood estimation method; and a log-likelihood function of formula (30) based on observed quantity $\{T_{2,i}^{(P_1)}, T_{1,i}^{(A)}, d^{(P_1P_2)}\}_{i=1}^{N}$ is represented as:

$$\ln L(\rho^{(P_1P_2)}, \delta^2) = -\frac{N}{2}\ln(4\pi\delta^2) - \frac{1}{2\delta^2}\sum_{i=1}^{N}\left[\frac{(T_{2,i}^{(P_2)} - T_{1,i}^{(P_1)} - d^{(P_1P_2)}) - \rho^{(P_1P_2)}(T_{1,i}^{(P_1)} - T_{2,i-1}^{(P_2)} - d^{(P_1P_2)}) + \epsilon_i}{1 + \rho^{(P_1P_2)}}\right]^2 \quad (31)$$

Partial derivatives of $\rho^{(P_1P_2)}$ on both sides of formula (31) are:

$$\frac{\partial \ln L(\rho^{(P_1P_2)}, \delta^2)}{\partial \rho^{(P_1P_2)}} = \frac{\sum_{i=1}^{N}\left[(T_{2,i}^{(P_2)} - T_{1,i}^{(P_1)} - d^{(P_1P_2)}) - \rho^{(P_1P_2)}(T_{1,i}^{(P_1)} - T_{2,i-1}^{(P_2)} - d^{(P_1P_2)}) + \epsilon_i\right]}{(1 + \rho^{(AP_1)})} \times \quad (32)$$

$$\frac{(T_{2,i-1}^{(P_2)} - T_{1,i}^{(P_1)} + d^{(P_1P_2)})(1 + \rho^{(P_1P_2)}) - [(T_{2,i}^{(P_2)} - T_{1,i}^{(P_1)} - d^{(P_1P_2)}) - \rho^{(P_1P_2)}(T_{1,i}^{(P_1)} - T_{2,i-1}^{(P_2)} - d^{(P_1P_2)}) + \epsilon_i]}{(1 + \rho^{(P_1P_2)})^2}$$

Formula (32) is made to be equal to 0, and a solution is:

$$\rho^{(P_1P_2)} = \frac{\sum_{i=1}^{N}\left[(T_{2,i}^{(P_2)} - T_{1,i}^{(P_1)} - d^{(P_1P_2)})(T_{2,i}^{(P_2)} - T_{2,i-1}^{(P_2)} - 2d^{(P_1P_2)} + 2\epsilon_i) - (T_{2,i-1}^{(P_2)} - T_{1,i}^{(P_1)} - d^{(P_1P_2)})\epsilon_i + \epsilon_i^2\right]}{\sum_{i=1}^{N}\left[(T_{2,i}^{(P_2)} - T_{1,i}^{(P_1)} - d^{(P_1P_2)})(T_{2,i-1}^{(P_2)} - 2T_{1,i}^{(P_1)} + T_{2,i}^{(P_2)}) + [(T_{1,i}^{(P_1)} - T_{2,i-1}^{(P_2)} - d^{(P_1P_2)})(T_{2,i}^{(P_2)} - T_{2,i-1}^{(P_2)} + \epsilon_i)]\right]} \quad (33)$$

$P_2$ only needs to obtain parameters in formula (33) to estimate $\rho^{(P_1P_2)}$. By selecting appropriate $d^{(P_1P_2)}$ value, $\rho^{(P_1P_2)}$ can be adjusted so that frequencies of node $P_2$ and node $P_1$ are gradually close, to complete time synchronization of $P_2$ and $P_1$.

In the method, the time synchronization information is extended from a two-level network to a three-level network; time adjustment of a first-level node after each synchronization cycle should consider the correction quantity of an upper-level node; in addition, the influence of fixed delay is added to the traditional correction quantity; and at the same time, it is not necessary to estimate frequency offset and clock offset jointly, but only needs to estimate the frequency offset separately, which can realize synchronization with node A, thereby reducing algorithm complexity while optimizing the correction quantity.

The terminal side conversion node is an important node which crosses the industrial wireless network and the TSN 1 to play a role of a bridge that connects two networks. In the past cross-network time synchronization methods, most of the synchronization modes use a hardware clock module to obtain the timestamps, which not only brings high hardware complexity, but also causes extra protocol overhead because different protocol networks use different time synchronization mechanisms.

With respect to the above problems, synchronization between the node device and the terminal side conversion node uses a timestamp-free synchronization method based on RSA algorithm herein, which does not rely on special synchronization protocols, and is not limited to different time synchronization protocols used by different networks, thereby getting rid of the dependence of existing timestamp-free synchronization methods on following response packets; only the transmission of the existing network data flow is followed to complete synchronization parameter estimation; and in the process of data flow interaction, there is no need to carry timestamp information, so that the synchronization message needed for cross-network time synchronization can be obtained implicitly.

Figure 7:
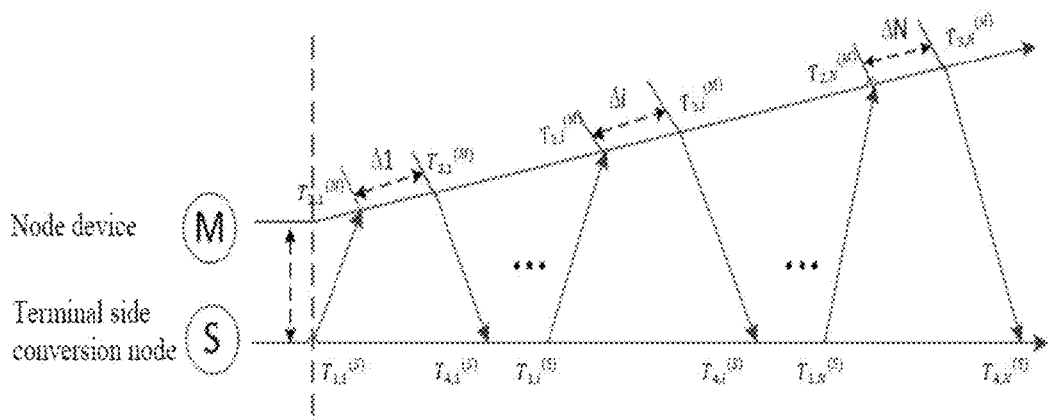
FIG. 7 is a timestamp-free synchronization protocol based on RSA algorithm.

As shown in FIG. 7, the node device of the industrial wireless network is used as the master clock, denoted as M; the terminal side conversion node is used as the slave clock, denoted as S; node S periodically sends ordinary data packets to node M; and synchronization information is transferred implicitly by controlling a response time interval $\Delta_i$ of a receiver for a sender.

In the $i^{th}$ synchronization cycle, sending node S sends an ordinary data packet to receiving node M at time $T_{1,i}^{(S)}$, and receiving node M receives the data packet at time $T_{2,i}^{(M)}$; after waiting for the response time interval $\Delta_i$, a response message is returned to sending node S at time $T_{3,i}^{(M)}$ and sending node S receives the response message at time $T_{4,i}^{(S)}$; then local receiving and sending time is recorded and stored in a local cache; with repeated processes of receiving and sending node data packets, the node can use the receiving and sending time of the local cache to estimate the clock frequency offset.

1. Presetting of Response Time Interval $\Delta_i$

In the timestamp-free synchronization method based on RSA algorithm, receiving node M determines the response time interval $\Delta_i$ according to the RSA algorithm. RSA algorithm is an asymmetric cryptographic algorithm. Given a number, different random numbers within the range of this number can be generated. The present invention only draws on the characteristic of RSA algorithm that can generate the random numbers. A specific mechanism is as follows:

It is assumed that the process is synchronized for N times; there is $A \in \{2, 3, 4, \ldots N-1\}$; any of prime numbers P, Q and D is taken, where N=P*Q; when (D*E)mod((P−1)*(Q−1))=1 is established, there is $C_i = (A_i \text{ EXP } D) \text{mod } N$; where $1 < i < N$; $C_i$ is a generated random number; meanwhile, $C_i$ is used to represent a response time interval $\Delta_i$ that a receiving node needs to wait for in an $i^{th}$ synchronization process. It is noted that according to the principle of the RSA algorithm, although synchronization is conducted for N times, a response time interval $\Delta_i$ in N−2 synchronization processes can only be obtained. When N is large enough, N−2 times of synchronization and N times of synchronization can be regarded as the same.

2. Modeling of Timestamp-Free Synchronization Method Based on RSA Algorithm $f_S$ and $f_M$ are set as crystal oscillator frequencies of node S and node M respectively, and a clock frequency offset $$\rho^{(MS)} = \frac{f_M}{f_S}$$

of node S relative to node M is defined.

In the first synchronization cycle, as shown in FIG. 7, when node S sends an ordinary data packet to node M at time $T_{1,1}^{(S)}$ time $T_{2,1}^{(M)}$ when node M receives the data packet can be represented as a formula below:

$$T_{2,1}^{(M)} = \rho^{(MS)} \times T_{1,1}^{(S)} + \theta_{t_0} + \rho^{(MS)} \times (d_1 + X_1) \quad (34)$$

where $\theta_{t_0}$ represents an initial clock offset of node S relative to node M; $d_1$ represents fixed time delay generated in a process of receiving and sending the data packets; $X_1$ represents random time delay generated in the process of receiving and sending the data packets.

Time $T_{3,1}^{(M)}$ when node M sends a response message to node S can be obtained according to the above RSA algorithm, i.e., $T_{3,1}^{(M)} = T_{2,1}^{(M)} + \Delta_2$; time when node S receives the response message sent by node M is denoted as $T_{4,1}^{(S)}$, then:

$$T_{3,1}^{(M)} = \rho^{(MS)} \times T_{4,1}^{(S)} + \theta_{t_0} - \rho^{(MS)} \times (d_2 + Y_1) \quad (35)$$

where $d_2$ is fixed time delay of the response message in transmission, and $d_2 = d_1 - m$; here, the size of m is in direct proportion to a difference between length of uplink data packet messages and length of downlink response messages; $Y_1$ is downlink random time delay in the first synchronization cycle.

In the second synchronization cycle, node S sends an ordinary data packet to node M at time $T_{1,2}^{(S)}$, and node M receives the data packet at time $T_{2,2}^{(M)}$; a value of the response time interval $\Delta_2$ in the second synchronization cycle can be obtained according to the RSA algorithm; at this moment, time when node M sends a response message is $T_{3,2}^{(M)} = T_{2,2}^{(M)} + \Delta_2$, and then:

$$T_{3,2}^{(M)} = \rho^{(MS)} \times T_{4,2}^{(S)} + \theta_{t_0} - \rho^{(MS)} \times (d_1 + Y_2) \quad (36)$$

where $d_2$ is fixed time delay generated by the data packets in a process of receiving and sending the data packets in the second synchronization cycle; and $Y_2$ is downlink random time delay in the second synchronization cycle.

In the third synchronization cycle, node S sends an ordinary data packet to node M at time $T_{1,3}^{(S)}$, and node M receives the data packet at time $T_{2,3}^{(M)}$; a value of the response time interval $\Delta_3$ in the third synchronization cycle can be obtained according to the RSA algorithm; at this moment, time when node M sends a response message is $T_{3,3}^{(M)} = T_{2,3}^{(M)} + \Delta_3$, and then:

$$T_{3,3}^{(M)} = \rho^{(MS)} \times T_{4,3}^{(S)} + \theta_{t_0} - \rho^{(MS)} \times (d_1 + Y_3) \quad (37)$$

where $Y_3$ represents downlink random time delay in the third synchronization cycle.

Similarly, in the $i^{th}$ synchronization cycle, node S sends an ordinary data packet to node M at time $T_{1,i}^{(S)}$ and node M receives the data packet at time $T_{2,i}^{(M)}$; a value of the response time interval $\Delta_i$ in the $i^{th}$ synchronization cycle can be obtained according to the RSA algorithm; at this moment, time when node M sends a response message is $T_{3,i}^{(M)}$; node S receives the response message returned by node M at time $T_{4,i}^{(S)}$. The following can be obtained:

$$T_{2,i}^{(M)} = \rho^{(MS)} \times T_{1,i}^{(S)} + \theta_{t_0} + \rho^{(MS)} \times (d_1 + X_i) \quad (38)$$

$$T_{3,i}^{(M)} = \rho^{(MS)} \times T_{4,i}^{(S)} + \theta_{t_0} - \rho^{(MS)} \times (d_2 + Y_i) \quad (39)$$

$$\Delta_i \in (\Delta_2, \Delta_3, \ldots, \Delta_{N-1}) \quad (40)$$

$$T_{3,i}^{(M)} = T_{2,i}^{(M)} + \Delta_i \quad (41)$$

where $X_i$ represents random time delay generated in the process of receiving and sending the data packets in the $i^{th}$ synchronization cycle; and Y represents downlink random time delay in the $i^{th}$ synchronization cycle.

After N−1 synchronization cycles, sending node S can obtain a set of local timestamp pairs $\{T_{1,i}^{(S)}, T_{4,i}^{(S)}\}_{i=2}^{N-1}$, and receiving node M can obtain a set of local timestamp pairs $\{T_{2,i}^{(M)}, T_{3,i}^{(M)}\}_{i=2}^{N-1}$; combined with the response time interval $\Delta_i$, the maximum likelihood estimation method is used to estimate frequency offset and fixed delay between nodes.

Formulas (39)-(38) are used to obtain:

$$T_{3,i}^{(M)} - T_{2,i}^{(M)} = \rho^{(MS)} \left[ T_{4,i}^{(S)} - T_{1,i}^{(S)} - (d_1 + d_2) - (X_i + Y_i) \right] \quad (42)$$

Because $X_i$ and $Y_i$ are Gaussian random distributions with mean of 0 and variance of $\sigma^2$ and $V_i = X_i + Y_i$ is made, $V_i$ is Gaussian random distribution with mean of 0 and variance of $2\sigma^2$.

$$\alpha = \frac{1}{\rho^{(MS)}}$$

is made; and then formula (42) can be simplified as:

$$\alpha \left( T_{3,i}^{(M)} - T_{2,i}^{(M)} \right) = \left( T_{4,i}^{(S)} - T_{1,i}^{(S)} \right) - 2d_1 + m - V_i \quad (43)$$

where $T_{3,i}^{(M)} - T_{2,i}^{(M)} = \Delta_i$, and then formula (43) is expressed as a matrix form below:

$$\begin{bmatrix} T_{4,2} - T_{1,2} + m \\ T_{4,3} - T_{1,3} + m \\ \ldots \\ T_{4,N-1} - T_{1,N-1} + m \end{bmatrix} = \begin{bmatrix} T_{3,2} - T_{2,2} & 2 \\ T_{3,3} - T_{2,3} & 2 \\ \ldots & 2 \\ T_{3,N-1} - T_{2,N-1} & 2 \end{bmatrix} \begin{bmatrix} \alpha \\ d_1 \end{bmatrix} + \begin{bmatrix} V_2 \\ V_3 \\ \ldots \\ V_{N-1} \end{bmatrix} \quad (44)$$

A maximum likelihood function of formula (44) about parameters $(\alpha, d_1, \sigma^2)$ can be expressed as:

$$L(\alpha, d_1, \sigma^2) = (2\pi \times 2\sigma^2)^{-\frac{N-1}{2}} \exp \quad (45)$$

$$\left\{ -\frac{1}{2 \times 2\sigma^2} \sum_{i=2}^{i=N-1} \left[ \left( T_{4,i}^{(S)} - T_{1,i}^{(S)} \right) - \alpha \Delta_i - 2d_1 + m \right]^2 \right\}$$

Logarithms of both sides of formula (45) are calculated to obtain:

$$\ln L(\alpha, d_1, \sigma^2) = \quad (46)$$

$$-\frac{N-1}{2} \ln(4\pi\sigma^2) - \frac{1}{4\sigma^2} \sum_{i=2}^{N-1} \left[ \left( T_{4,i}^{(S)} - T_{1,i}^{(S)} \right) - \alpha \Delta_i - 2d_1 + m \right]^2$$

A first-order partial derivative about α for formula (46) is calculated to obtain:

$$\frac{\partial \ln L(\alpha, d_1, \sigma^2)}{\partial \alpha} = \frac{1}{2\sigma^2}\sum_{i=2}^{N-1}\left[(T_{4,i}^{(S)} - T_{1,i}^{(S)} - \alpha\Delta_i - 2d_1 + m)\Delta_i\right] \quad (47)$$

A first-order partial derivative about $d_1$ for formula (46) is calculated to obtain:

$$\frac{\partial \ln L(\alpha, d_1, \sigma^2)}{\partial \alpha} = \frac{1}{2\sigma^2}\sum_{i=2}^{N-1}\left(T_{4,i}^{(S)} - T_{1,i}^{(S)} - \alpha\Delta_i - 2d_1 + m\right) \quad (48)$$

Formula (47) and formula (48) are made as 0, and maximum likelihood functions of $\rho^{(MS)}$ and $d_1$ can be obtained by simultaneous solution:

$$\rho^{(MS)} = \frac{1}{\alpha} = \frac{(N-2)\sum_{i=2}^{N-1}\Delta_i^2 - \left(\sum_{i=2}^{N-1}\Delta_i\right)^2}{(N-2)\sum_{i=2}^{N-1}\left[(T_{4,i}^{(S)} - T_{1,i}^{(S)} + m)\Delta_i\right] - \sum_{i=2}^{N-1}(T_{4,i}^{(S)} - T_{1,i}^{(S)} + m)\sum_{i=2}^{N-1}\Delta_i} \quad (49)$$

$$d_1 = \frac{\sum_{i=2}^{N-1}\Delta_i^2 \sum_{i=2}^{N-1}\left(T_{4,i}^{(S)} - T_{1,i}^{(S)} + m\right) - \sum_{i=2}^{N-1}\left[(T_{4,i}^{(S)} - T_{1,i}^{(S)} + m)\Delta_i\right]\sum_{i=2}^{N-1}\Delta_i}{2\left[(N-2)\sum_{i=2}^{N-1}\Delta_i^2 - \left(\sum_{i=2}^{N-1}\Delta_i\right)^2\right]} \quad (50)$$

Thus, the fixed time delay of the response message in transmission is $d_2 = d_1 - m$.

After the terminal side conversion node and the node device of the industrial wireless network complete synchronization, the TSN switch of the TSN 1 completes synchronization with the terminal side conversion node in the slave clock state, and a synchronization method is consistent with the time synchronization process of the TSN.

Finally, it should be noted that the above embodiments are only used for describing, rather than limiting the technical solution of the present invention. Although the present invention is described in detail with reference to the preferred embodiments, those ordinary skilled in the art shall understand that the technical solution of the present invention can be amended or equivalently replaced without departing from the purpose and the scope of the technical solution. The amendment or equivalent replacement shall be covered within the scope of the claims of the present invention.

What is claimed is:

1. A cross-network time synchronization method for industrial wireless network and Time-Sensitive Networking (TSN) fusion, characterized by comprising the following steps:
   S1: conducting clock synchronization by a TSN module of a border gateway with a TSN switch of a TSN 2 in a slave clock state;
   S2: inside the border gateway, using the TSN module as a master clock of an industrial wireless module, and conducting clock synchronization by the industrial wireless module with the TSN module through a serial port;
   S3: conducting clock synchronization by a routing device in the industrial wireless network with the industrial wireless module of the border gateway through a beacon frame synchronization mode in the slave clock state, and conducting clock synchronization by the routing device as the master clock of a node device for the node device;
   S4: conducting clock synchronization by a terminal side conversion node in the slave clock state with the node device in the industrial wireless network through a timestamp-free synchronization mode, and finally, synchronizing a TSN switch of a TSN 1 with the terminal side conversion node in the slave clock state.

2. The cross-network time synchronization method for industrial wireless network and TSN fusion according to claim 1, characterized in that: step S1 specifically comprises the following steps:
   S11: obtaining timestamps t1, t2, t3 and t4 by a slave clock by using a peer-to-peer delay measurement mechanism;
   S12: calculating link delay of the master clock and the slave clock by the slave clock;
   S13: calculating processing time denoted as time_process by the slave clock;
   S14: denoting a sum of the link delay and the processing time as Δ1.

3. The cross-network time synchronization method for industrial wireless network and TSN fusion according to claim 2, characterized in that: in step S1, the delay measurement mechanism is used to measure the link delay of the master clock and the slave clock; corresponding timestamps are obtained by exchanging a delay request message Delay_rep and a delay response message Delay_resp between the slave clock and the master clock; Delay_resp(t2) represents that the delay response message replied to the slave clock at time t3 by the master clock carries time t2; Follow_up_delay_resp(t3) represents that a follow-up delay response message sent by the master clock to the slave clock carries time t3; after a Follow_up_delay_resp message is sent, the slave clock receives the timestamps t1, t2, t3 and t4; the link delay delay_resp between the slave clock and the master clock is calculated as S shown by expression (1):

$$\text{delay\_resp} = \frac{(t2 - t1) + (t4 - t3)}{2} \quad (1)$$

the processing time is local time, which is duration time of a time interval between reception of a time synchronization event message by the master clock and transmission of a next subsequent time synchronization event message by the master clock; and the processing time is denoted as time_process, which is t3 here;
the sum of the link delay and the processing time is denoted as Δ1=delay_resp+time_process.

4. The cross-network time synchronization method for industrial wireless network and TSN fusion according to claim 1, characterized in that: the border gateway comprises an industrial wireless module and a TSN module; an Serial Line Internet Protocol (SLIP) is used to encapsulate IP data packets; and transparency of data transmission is ensured through an SLIP serial port, so that data is seamlessly connected between two networks.

5. The cross-network time synchronization method for industrial wireless network and TSN fusion according to claim 4, characterized in that: in step S2, a synchronization pulse signal outputted by a TSN module clock is a 1Pulse Per Second (PPS) pulse, and the industrial wireless module adjusts own local time by detecting the synchronization pulse signal outputted by the TSN module clock, comprising the following steps:

S21: sending, by the TSN module, an own initial clock $T_0$ to the industrial wireless module through a serial port, and setting, by the industrial wireless module, own local initial time local_time0 according to time;

S22: starting an interrupt program to start to detect a 1 PPS pulse signal outputted by the TSN module, and when detecting a 1 PPS signal by the industrial wireless module, denoting time of receiving the 1 PPS signal as local_time1;

S23: correcting an own local clock once by the industrial wireless module;

assuming that the industrial wireless module is corrected at time local_time2, corrected time local_time satisfies the following expression:

$$\text{local\_time0} = T_0 + S/R \quad (2)$$

$$\text{local\_time} = \text{local\_time2} + N - \text{local\_time1} \quad (3)$$

where S represents length of a serial port message, R represents a serial port baud rate, and N represents number of pulses received by the industrial wireless module.

6. The cross-network time synchronization method for industrial wireless network and TSN fusion according to claim 1, characterized in that: in step S3, the industrial wireless module is denoted as A, the routing device is denoted as $P_1$, and the node device is denoted as $P_2$;

time when node A sends a time message to node $P_1$ to time when node $P_1$ receives the message is a synchronization cycle of interaction between node A and node $P_1$, and a process between node A and node $P_1$ is repeated for N times to generate N synchronization cycles; after each time two nodes conduct one-way interaction of time information, i.e., one synchronization cycle, node $P_1$ calculates clock frequency offset through the timestamp information for adjustment;

after adjustment of node $P_1$, a time message is sent to node $P_2$; time when node $P_1$ sends the time message to node $P_2$ to time when node P receives the message is a synchronization cycle of interaction between node $P_1$ and node $P_2$; a process between node $P_1$ and node P is repeated for N times to generate N synchronization cycles; after each time two nodes conduct one-way interaction of time information, i.e., one synchronization cycle, node $P_2$ calculates clock frequency offset through the timestamp information for adjustment;

in a first synchronization cycle between node A and node $P_1$, node A sends current time information $T_{1,1}^{(A)}$ to node $P_1$, and receiving time $T_{2,1}^{(P_1)}$ recorded by $P_1$ is represented as:

$$T_{2,1}^{(P_1)} = T_{1,1}^{(A)} + \theta_{t0}^{(AP_1)} + \rho^{(AP_1)}\left(T_{1,1}^{(A)} - t_0\right) + \quad (4)$$

$$d^{(AP_1)} + X_1^{(AP_1)} + \rho^{(AP_1)}\left(d^{(AP_1)} + X_1^{(AP_1)}\right)$$

in a formula, $\theta_{t0}^{(AP_1)}$ represents an initial clock offset of node $P_1$ relative to reference node A at time $t_0$; $\rho^{(AP_1)}$ represents a clock frequency offset of node $P_1$ relative to reference node A; $d^{(AP_1)}$ represents fixed time delay generated in a process of receiving and sending time information; $X^{(AP_1)}$ represents random time delay generated in the process of receiving and sending time information; $\rho^{(AP_1)}(d^{(AP_1)}+X^{(AP_1)})$ represents a synchronization error accumulated due to frequency offset in the process of receiving and sending time information;

further, in the first synchronization cycle of node A and node $P_1$, a difference $\Delta T_1^{(AP_1)}$ of receiving and sending timestamps between node A and node $P_1$ to be synchronized is represented as:

$$\Delta T_1^{(AP_1)} = T_{2,1}^{(P_1)} - T_{1,1}^{(A)} - d^{(AP_1)} \quad (5)$$

$$= \theta_{t0}^{(AP_1)} + \rho^{(AP_1)}\left(T_{1,1}^{(A)} - t_0\right) + X_1^{(AP_1)} + \rho^{(AP_1)}\left(d^{(AP_1)} + X_1^{(AP_1)}\right)$$

$T_{5,1}^{(P_1)}$ is correction time of the first cycle of $P_1$; then, node $P_1$ uses the difference $\Delta T_1^{(AP_1)}$ to adjust the own local clock at time $T_{5,1}^{(P_1)}$ and time adjusted by $P_1$ is represented by $T_{5,1}^{(P_1)*}$, and there is $$T_{5,1}^{(P_1)*} = T_{5,1}^{(P_1)} + \Delta T_1^{(AP_1)} = T_{5,1}^{(P_1)} + T_{2,1}^{(P_1)} - T_{1,1}^{(A)} - d^{(Ap_1)} \quad (6)$$

in a period from initial time $t_0$ to the correction time $T_{5,1}^{(P_1)}$, a real clock deviation $\Delta T_{true,1}^{(AP_1)}$ between node A and node $P_1$ is:

$$\Delta T_{true,1}^{(AP_1)} = \theta_{t0}^{(AP_1)} + \rho^{(AP_1)}\left(T_{5,1}^{(P_1)} - t_0\right) \quad (7)$$

rom formulas (7)-(5), a new clock offset $\theta_{t1}^{(AP_1)}$ of node $P_1$ after adjustment is obtained as:

$$\theta_{t1}^{(AP_1)} = \quad (8)$$

$$\Delta T_{true,1}^{(AP_1)} - \Delta T_1^{(AP_1)} = \rho^{(AP_1)}\left(T_{5,1}^{(P_1)} - T_{1,1}^{(A)} - d^{(AP_1)} - X_1^{(AP_1)}\right) - X_1^{(AP_1)}$$

in a second synchronization cycle between node A and node $P_1$, node A sends current time information $T_{1,2}^{(A)}$ to node $P_1$, and receiving time $T_{2,2}^{(P_1)}$ recorded by node $P_1$ is represented as:

$$T_{2,2}^{(P_1)} = T_{1,2}^{(A)} + \theta_{t1}^{(AP_1)} + \rho^{(AP_1)}\left(T_{1,2}^{(A)} - T_{5,1}^{(P_1)*}\right) + \quad (9)$$

$$d^{(AP_1)} + X_2^{(AP_1)} + \rho^{(AP_1)}\left(d^{(AP_1)} + X_2^{(AP_1)}\right)$$

where $X_2^{(AP_1)}$ is random time delay generated in a process of receiving and sending time information of the second synchronization cycle between node A and node $P_1$;

further, in the second synchronization cycle of node A and node $P_1$, a difference $\Delta T_2^{(AP_1)}$ of receiving and sending timestamps between reference node A and node $P_1$ is represented as:

$$\Delta T_2^{(AP_1)} = T_{2,2}^{(P_1)} - T_{1,2}^{(A)} - d^{(AP_1)} = \quad (10)$$

$$\theta_{t1}^{(AP_1)} + \rho^{(AP_1)}\left(T_{1,2}^{(A)} - T_{5,1}^{(P_1)*}\right) + X_2^{(AP_1)} + \rho^{(AP_1)}\left(d^{(AP_1)} + X_2^{(AP_1)}\right)$$

time of $P_1$ after adjustment in the first synchronization cycle is set as $T_{5,1}^{(P_1)*}$ and time of node A, corresponding to the time, is $T_{5,1}^{(A)*}$; $T_{5,1}^{(P_1)*}=T_{5,1}^{(A)*}$ is set; formula (10) is changed as:

$$\Delta T_2^{(AP_1)} = \qquad (11)$$
$$\theta_{t1}^{(AP_1)} + \rho^{(AP_1)}\left(T_{1,2}^{(A)} - T_{5,1}^{(A)*}\right) + X_2^{(AP_1)} + \rho^{(AP_1)}\left(d^{(AP_1)} + X_2^{(AP_1)}\right)$$

$\theta_{t1}^{(AP_1)}$ and $T_{5,1}^{(A)*}$ are substituted into formula (11) to obtain:

$$\Delta T_2^{(AP_1)} = \qquad (12)$$
$$\rho^{(AP_1)}\left(T_{1,2}^{(A)} - X_1^{(AP_1)} + X_2^{(AP_1)} - T_{2,1}^{(P_1)} + d^{(AP_1)}\right) - X_1^{(AP_1)} + X_2^{(AP_1)}$$

in a period from $T_{5,1}^{(P_1)*}$ to $T_{5,2}^{(P_1)}$ (i.e., in the second synchronization cycle between node A and node $P_1$, a real clock deviation $\Delta T_{true,2}^{(AP_1)}$ between node A and node $P_1$ is:

$$\Delta T_{true,2}^{(AP_1)} = \theta_{t1}^{(AP_1)} + \rho^{(AP_1)}\left(T_{5,2}^{(P_1)} - T_{5,1}^{(P_1)*}\right) \qquad (13)$$

where $T_{5,2}^{(P_1)}$ is correction time of $P_1$ in the second cycle of node A and node $P_1$;
from formulas (13)-(12), a new clock offset $\theta_{t2}^{(AP_1)}$ of node $P_1$ after second adjustment is obtained as:

$$\theta_{t2}^{(AP_1)} = \qquad (14)$$
$$\Delta T_{true,2}^{(AP_1)} - \Delta T_2^{(AP_1)} = \rho^{(AP)}\left(T_{5,2}^{(P_1)} - T_{1,2}^{(A)} - d^{(AP_1)} - X_2^{(AP_1)}\right) - X_2^{(AP_1)}$$

in an $i^{th}$ synchronization cycle of node A and node $P_1$, a difference $\Delta T_i^{(AP_1)}$ of receiving and sending timestamps between reference node A and node $P_1$ is obtained as:

$$\Delta T_i^{(AP_1)} = \qquad (15)$$
$$\rho^{(AP_1)}\left(T_{1,i}^{(A)} - X_{i-1}^{(AP_1)} + X_i^{(AP_1)} - T_{2,i-1}^{(P_1)} + d^{(AP_1)}\right) - X_{i-1}^{(AP_1)} + X_i^{(AP_1)}$$

where $X_i^{(AP_1)}$ is random time delay generated in a process of receiving and sending time information of the $i^{th}$ cycle between node A and node $P_1$;
a new clock offset $\theta_{ti}^{(AP_1)}$ of node $P_1$ after $i^{th}$ adjustment is:

$$\theta_{ti}^{(AP_1)} = \qquad (16)$$
$$\Delta T_{true,i}^{(AP_1)} - \Delta T_i^{(AP_1)} = \rho^{(AP_1)}\left(T_{5,i}^{(P_1)} - T_{1,i}^{(A)} - d^{(AP_1)} - X_i^{(AP_1)}\right) - X_i^{(AP_1)}$$

to simplify calculation, formula (15) is transformed into the following expression:

$$\Delta T_i^{(AP_1)} = \rho^{(AP_1)}\left(T_{1,i}^{(A)} - T_{2,i-1}^{(P_1)} - d^{(AP_1)}\right) + \left(1 + \rho^{(AP_1)}\right)\left(X_i^{(AP_1)} - X_{i-1}^{(AP_1)}\right) \qquad (17)$$

$Q_i = X_i^{(AP_1)} - X_{i-1}^{(AP_1)}$ is made; $Q_i$ is a random variable which obeys Gaussian distribution, i.e., $Q_i \sim (0, \delta^2)$; frequency offset $\rho^{(AP_1)}$ is estimated by using a maximum likelihood estimation method; and a log-likelihood function of formula (17) based on observed quantity $\{T_{2,i}^{(P_1)}, T_{1,i}^{(A)}, d^{(AP_1)}\}_{i=1}^{N}$ is represented as:

$$\ln L\left(\rho^{(AP_1)}, \delta^2\right) = \qquad (18)$$
$$-\frac{N}{2}\ln(2\pi\delta^2) - \frac{1}{2\delta^2}\sum_{i=1}^{N}\left[\frac{T_{2,i}^{(P_1)} - T_{1,i}^{(A)} - d^{(AP_1)} - \rho^{(AP_1)}\left(T_{1,i}^{(A)} - T_{2,i-1}^{P_1}\right)}{1 + \rho^{(AP_1)}}\right]^2$$

a partial derivative of $\rho^{(AP_1)}$ is calculated and made as 0;

$$\frac{\partial \ln L\left(\rho^{(AP_1)}, \delta^2\right)}{\partial \rho^{(AP_1)}} = \frac{\sum_{i=1}^{N}\left[\left(T_{2,i}^{(P_1)} - T_{1,i}^{(A)} - d^{(AP_1)} - \rho^{(AP_1)}\left(T_{1,i}^{(A)} - T_{2,i-1}^{(P_1)}\right)\right)\left(T_{2,i}^{(P_1)} - T_{2,i-1}^{(P_1)} - d^{(AP_1)}\right)\right]}{\left(1 + \rho^{(AP_1)}\right)^3}$$
$$= 0$$

a solution is obtained as:

$$\rho^{(AP_1)} = \frac{\sum_{k=1}^{N}\left(\tau_{2,i}^{(P_1)} - \tau_{1,i}^{(A)} - d^{(AP_1)}\right)\left(\tau_{2,i}^{(P_1)} - \tau_{2,i-1}^{(P_1)} - d^{(AP_1)}\right)}{\sum_{k=1}^{N}\left(T_{1,i}^{(A)} - T_{2,i-1}^{(P_1)}\right)\left(T_{2,i}^{(P_1)} - T_{2,i-1}^{(P_1)} - d^{(AP_1)}\right)} \qquad (19)$$

$P_1$ only needs to obtain parameters in formula (19) to estimate $\rho^{(AP_1)}$; by selecting appropriate $d^{(AP_1)}$ value, $\rho^{(AP_1)}$ can be adjusted so that frequencies of node $P_1$ and node A are gradually close, to complete time synchronization of $P_1$ and A.

7. The cross-network time synchronization method for industrial wireless network and TSN fusion according to claim 6, characterized in that: in step S3, after node $P_1$ receives the time information from reference node A, similarly, node $P_2$ uses node $P_1$ as the reference node, and node $P_1$ sends the time information to node $P_2$;
in the first synchronization cycle between node $P_1$ and node $P_2$, node $P_1$ sends current time information $T_{1,1}^{(P_1)}$ to node $P_2$, and time when node $P_2$ receives the time information sent by node $P_1$ is denoted as $T_{2,1}^{(P_1)}$, which is represented as:

$$T_{2,1}^{(P_2)} = T_{1,1}^{(P_1)} + \theta_{t0}^{(P_1P_2)} + \rho^{(P_1P_2)}\left(T_{1,1}^{(P_1)} - t_0\right) + \qquad (20)$$
$$d^{(P_1P_2)} + X_1^{(P_1P_2)} + \rho^{(P_1P_2)}\left(d^{(P_1P_2)} + X_1^{(P_1P_2)}\right)$$

in a formula, $\theta_{t0}^{(P_1P_2)}$ represents an initial clock offset of node $P_2$ at time $t_0$ relative to reference node $P_1$; $\rho^{(P_1P_2)}$ represents a clock frequency offset of node $P_2$ relative to reference node $P_1$; $d^{(P_1P_2)}$ represents fixed time delay generated in a process of receiving and sending time information; $X_1^{(P_1P_2)}$ represents random time delay generated in the process of receiving and sending time information; $\rho^{(P_1P_2)}(d^{(P_1P_2)} + X_1^{(P_1P_2)})$ represents a synchronization error accumulated due to frequency offset in the process of receiving and sending time information;
in the first synchronization cycle of node $P_1$ and node $P_2$, a difference $\Delta T_1^{(P_1P_2)}$ of receiving and sending timestamps between node $P_1$ and node $P_2$ is:

$$\Delta T_1^{(P_1P_2)} = T_{2,1}^{(P_2)} - T_{1,1}^{(P_1)} - d^{(P_1P_2)} = \qquad (21)$$
$$\theta_{t0}^{(P_1P_2)} + \rho^{(P_1P_2)}\left(T_{1,1}^{(P_1)} - t_0\right) + X_1^{(P_1P_2)} + \rho^{(P_1P_2)}\left(d^{(P_1P_2)} + X_1^{(P_1P_2)}\right)$$

$T_{5,1}^{(P_2)}$ is correction time of $P_2$ in the first synchronization cycle of node $P_1$ and node $P_2$; then, node $P_2$ uses the difference $\Delta T_1^{(P_1P_2)}$ of the timestamps to adjust the local clock at time $T_{5,1}^{(P_2)}$ and adjusted local time is represented by $T_{5,1}^{(P_2)}$, and there is $T_{5,1}^{(P_2)*} = T_{5,1}^{(P_2)} + \Delta T_1^{(P_1P_2)}$;

in a period from the initial time to the correction time, a real clock deviation $\Delta T_{true,1}^{(P_1P_2)}$ between node $P_1$ and node $P_2$ is:

$$\Delta T_{true,1}^{(P_1P_2)} = \theta_{t0}^{(P_1P_2)} + \rho^{(P_1P_2)}\left(T_{5,1}^{(P_2)} - t_0\right) \qquad (22)$$

from formulas (22)-(21), a new clock offset $\theta_{t1}^{(P_1P_2)}$ of node $P_2$ after adjustment in the first synchronization cycle of node $P_1$ and node $P_2$ is:

$$\theta_{t1}^{(P_1P_2)} = \Delta T_{true,1}^{(P_1P_2)} - \Delta T_1^{(P_1P_2)} = \qquad (23)$$
$$\rho^{(P_1P_2)}\left(T_{5,1}^{(P_2)} - T_{1,1}^{(P_1)} - d^{(P_1P_2)} - X_1^{(P_1P_2)}\right) - X_1^{(P_1P_2)}$$

in the second synchronization cycle between node $P_1$ and node $P_2$, reference node $P_1$ needs to use a difference $\Delta T_1^{(AP_1)}$ of the receiving and sending timestamps of node A and node $P_1$ in the first synchronization cycle to correct an own local clock in each cycle, so for nodes $P_2$ and $P_1$, a difference $\Delta T_1^{(P_1P_2)}$ of the receiving and sending timestamps is represented as:

$$T_{2,2}^{(P_2)} - T_{1,2}^{(P_1)} - d^{(P_1P_2)} + \Delta T_1^{(AP_1)} = \qquad (24)$$
$$\theta_{t1}^{(P_1P_2)} + \rho^{(P_1P_2)}\left(T_{1,2}^{(P_1)} - T_{5,1}^{(P_2)*}\right) + X_2^{(P_1P_2)} + \rho^{(P_1P_2)}\left(d^{(P_1P_2)} + X_2^{(P_1P_2)}\right)$$

where $T_{1,2}^{(P_1)}$ is sending time when node $P_1$ sends a synchronization message to node $P_2$ in the second synchronization cycle between node $P_1$ and node $P_2$; $T_{2,2}^{(P_2)}$ is receiving time when node $P_2$ receives the synchronization message in the second synchronization cycle between node $P_1$ and node $P_2$; $X_2^{(P_1P_2)}$ is random time delay generated in a process of receiving and sending time information of the second synchronization cycle between node $P_1$ and node $P_2$;

$\theta_{t1}^{(P_1P_2)}$ and $T_{5,1}^{(P_2)*}$ are substituted into formula (24) to obtain a difference $\Delta T_1^{(P_1P_2)}$ of receiving and sending timestamps between node $P_1$ and node $P_2$ in the second synchronization cycle of node $P_1$ and node $P_2$ is:

$$\Delta T_2^{(P_1P_2)} = T_{2,2}^{(P_2)} - T_{1,2}^{(P_1)} - d^{(P_1P_2)} = \qquad (25)$$
$$\rho^{(P_1P_2)}\left(T_{1,2}^{(P_1)} - T_{2,1}^{(P_2)} - X_1^{(P_1P_2)} + X_2^{(P_1P_2)} + d^{(P_1P_2)}\right) - $$
$$X_1^{(P_1P_2)} + X_2^{(P_1P_2)} - \left(T_{2,1}^{(P_1)} - T_{1,1}^{(A)} - d^{(AP_1)}\right)$$

where $T_{2,1}^{(P_2)}$ represents receiving time when node $P_2$ receives time information sent by node $P_1$ in the first synchronization cycle between node $P_1$ and node $P_2$; $T_{2,1}^{(P_1)}$ represents receiving time when node $P_1$ receives time information sent by node A in the first synchronization cycle between node A and node $P_1$; $T_{1,1}^{(A)}$ represents sending time when node A sends a time message to node $P_1$ in the first synchronization cycle between node A and node $P_1$;

$T_{5,2}^{(P_2)}$ is correction time of $P_2$ in the second cycle of node $P_1$ and node $P_2$; then, node $P_2$ uses the difference $\Delta T_2^{(P_1P_2)}$ of the timestamps to adjust the local clock at time $T_{5,2}^{(P_2)}$ and adjusted time is represented by $T_{5,2}^{(P_2)*}$, and there is $T_{5,2}^{(P_2)*} = T_{5,2}^{(P_2)} + \Delta T_2^{(P_1P_2)}$;

in the first synchronization cycle of node $P_1$ and node $P_2$, adjusted time of node $P_2$ at time $T_{5,1}^{(P_2)}$ is $T_{5,1}^{(P_2)}$; in a period from time corresponding to this time $t_0$ corresponding time $T_{5,2}^{(P_2)}$, a real clock deviation $\Delta T_{true,2}^{(P_1P_2)}$ of node $P_2$ compared with $P_1$ is:

$$\Delta T_{true,2}^{(P_1P_2)} = \theta_{t1}^{(P_1P_2)} + \rho^{(P_1P_2)}\left(T_{5,2}^{(P_2)} - T_{5,1}^{(P_2)*}\right) \qquad (26)$$

from formulas (26)-(25), a clock offset $\theta_{t2}^{(P_1P_2)}$ of node $P_2$ after adjustment in the second synchronization cycle of node $P_1$ and node $P_2$ is:

$$\theta_{t2}^{(P_1P_2)} = \Delta T_{true,2}^{(P_1P_2)} - \Delta T_2^{(P_1P_2)} = \qquad (27)$$
$$\rho^{(P_1P_2)}\left(T_{5,2}^{(P_2)} - T_{1,2}^{(P_1)} - X_2^{(P_1P_2)} - d^{(P_1P_2)}\right) - X_2^{(P_1P_2)} + \Delta T_1^{(AP_2)}$$

where $T_{1,2}^{(P_1)}$ is sending time when node $P_1$ sends a synchronization message to node $P_2$ in the second synchronization cycle between node $P_1$ and node $P_2$; $\Delta T_1^{(AP_1)}$ represents a difference of the receiving and sending timestamps between node A and node $P_1$ in the first synchronization cycle between node A and node $P_1$;

in a third synchronization cycle between node $P_1$ and node $P_2$, reference node $P_1$ needs to use a difference $\Delta T_1^{(AP_1)}$ of the receiving and sending timestamps of node A and node $P_1$ in the second synchronization cycle to correct an own local clock in each cycle, so for nodes $P_2$ and $P_1$, a difference $\Delta T_3^{(P_1P_2)}$ of the receiving and sending timestamps in the third synchronization cycle between node $P_1$ and node $P_2$ is represented as:

$$T_{2,3}^{(P_2)} - T_{1,3}^{(P_1)} - d^{(P_1P_2)} + \Delta T_2^{(AP_1)} = \qquad (28)$$
$$\theta_{t2}^{(P_1P_2)} + \rho^{(P_1P_2)}\left(T_{1,3}^{(P_1)} - T_{5,2}^{(P_2)*}\right) + X_3^{(P_1P_2)} + \rho^{(P_1P_2)}\left(d^{(P_1P_2)} + X_3^{(P_1P_2)}\right)$$

$\theta_{t2}^{(P_1P_2)}$ and $T_{5,2}^{(P_2)}$ are substituted into above formula to obtain a difference $\Delta T_3^{(P_1P_2)}$ of receiving and sending timestamps between node $P_1$ and node $P_2$ in the third synchronization cycle of node $P_1$ and node $P_2$ is:

$$\Delta T_3^{(P_1P_2)} = T_{2,3}^{(P_2)} - T_{1,3}^{(P_1)} - d^{(P_1P_2)} = \qquad (29)$$
$$\rho^{(P_1P_2)}\left(T_{1,3}^{(P_1)} - T_{2,2}^{(P_2)} - X_2^{(P_1P_2)} + X_3^{(P_1P_2)} + d^{(P_1P_2)}\right) - X_2^{(P_1P_2)} + $$
$$X_3^{(P_1P_2)} - \left[\left(T_{2,2}^{(P_1)} - T_{1,2}^{(A)} - d^{(AP_1)}\right) - T_{2,1}^{(P_1)} - T_{1,1}^{(A)} - d^{(AP_1)}\right)\right]$$

where $T_{2,2}^{(P_2)}$ represents receiving time when node $P_2$ receives time information sent by node $P_1$ in the second synchronization cycle between node $P_1$ and node $P_2$; $T_{2,2}^{(P_1)}$ represents receiving time when node $P_1$ receives time information sent by node A in the second synchronization cycle between node A and node $P_1$; $T_{1,2}^{(A)}$ represents sending time when node A sends a time message to node $P_1$ in the second synchronization cycle between node A and node $P_1$; $T_{2,1}^{(P_1)}$ represents receiving time when node $P_1$ receives time information sent by node A in the first synchronization cycle between node A and node $P_1$; $T_{1,1}^{(A)}$ represents sending time when node A sends a time message to node $P_1$ in the first synchronization cycle between node A and node $P_1$;

in the $i^{th}$ synchronization cycle between node $P_1$ and node $P_2$, reference node $P_1$ needs to use a difference $\Delta T_1^{(AP_1)}$ of the receiving and sending timestamps of node A and node $P_1$ in the $i^{th}$ synchronization cycle to correct an own local clock in each cycle, so for nodes $P_2$ and $P_1$, a difference $\Delta T_i^{(P_1P_2)}$ of the receiving and sending timestamps is represented as:

$$\Delta T_i^{(P_1 P_2)} = \quad (30)$$
$$\rho^{(P_1 P_2)}(T_{1,i}^{(P_1)} - T_{2,i-1}^{(P_2)} - X_{i-1}^{(P_1 P_2)} + X_i^{(P_1 P_2)} + d^{(P_1 P_2)}) - X_{i-1}^{(P_1 P_2)} +$$
$$X_i^{(P_1 P_2)} - \left[(T_{2,i-1}^{(P_1)} - T_{1,i-1}^{(A)}) - \sum_{j=1}^{i}(T_{2,i-j-1}^{(P_1)} - T_{1,i-j-1}^{(A)})\right] - (i-3)d^{(P_1 P_2)}$$
$$\epsilon_i = \left[(T_{2,i-1}^{(P_1)} - T_{1,i-1}^{(A)}) - \sum_{j=1}^{i}(T_{2,i-j-1}^{(P_1)} - T_{1,i-j-1}^{(A)})\right] + (i-3)d^{(P_1 P_2)} \text{ is set;}$$

where $T_{1,i}^{(P_1)}$ is represented as sending time when node $P_1$ sends a synchronization message to node $P_2$ in the $i^{th}$ synchronization cycle between node $P_1$ and node $P_2$; $T_{2,i-1}^{(P_2)}$ represents receiving time when node $P_2$ receives time information sent by node $P_1$ in an i–1$^{th}$ synchronization cycle between node $P_1$ and node $P_2$; $X_i^{(P_1P_2)}$ represents random time delay generated in a process of receiving and sending time information of the $i^{th}$ synchronization cycle between node $P_1$ and node $P_2$; $T_{2,i-1}^{(P_1)}$ represents receiving time when node $P_1$ receives time information sent by node A in the i–1$^{th}$ synchronization cycle between node A and node $P_1$; $T_{1,i-1}^{(A)}$ represents sending time when node A sends a time message to node $P_1$ in the i–1$^{th}$ synchronization cycle between node A and node $P_1$; $T_{2,i-j-1}^{(P_1)}$ represents sending time when node $P_1$ sends a synchronization message to node $P_2$ in an i–j–1$^{th}$ synchronization cycle between node $P_1$ and node $P_2$; $T_{1,i-j-1}^{(A)}$ represents sending time when node A sends a time message to node $P_1$ in the i–j–1$^{th}$ synchronization cycle between node A and node $P_1$;

frequency offset $\rho^{(P_1P_2)}$ is estimated by using the maximum likelihood estimation method; and a log-likelihood function of formula (30) based on observed quantity $\{T_{2,i}^{(P_1)}, T_{1,i}^{(A)}, d^{(P_1P_2)}\}_{i=1}^{N}$ is represented as:

$$\ln^{L(\rho^{(P_1P_2)},\delta^2)} = \quad (31)$$
$$-\frac{N}{2}\ln^{(4\pi\delta^2)} - \frac{1}{2\delta^2}\sum_{k=1}^{N}\left[\frac{(T_{2,i}^{(P_2)} - T_{1,i}^{(P_1)} - d^{(P_1P_2)}) - \rho^{(P_1P_2)}(T_{1,i}^{(P_1)} - T_{2,i-1}^{(P_2)} - d^{(P_1P_2)}) + \epsilon_i}{1 + \rho^{(P_1P_2)}}\right]^2$$

partial derivatives of $\rho^{(P_1P_2)}$ on both sides of formula (31) are:

$$\frac{\partial \ln^{L(\rho^{(P_1P_2)},\delta^2)}}{\partial \rho^{(P_1P_2)}} = \frac{\sum_{k=1}^{N}\left[(T_{2,i}^{(P_2)} - T_{1,i}^{(P_1)} - d^{(P_1P_2)}) - \rho^{(P_1P_2)}(T_{1,i}^{(P_1)} - T_{2,i-1}^{(P_2)} - d^{(P_1P_2)}) + \epsilon_i\right]}{(1 + \rho^{(AP_1)})} \times \quad (32)$$
$$\frac{(T_{2,i-1}^{(P_2)} - T_{1,i}^{(P_1)} + d^{(P_1P_2)})}{(1 + \rho^{(P_1P_2)}) - [(T_{2,i}^{(P_2)} - T_{1,i}^{(P_1)} - d^{(P_1P_2)}) - \rho^{(P_1P_2)}(T_{1,i}^{(P_1)} - T_{2,i-1}^{(P_2)} - d^{(P_1P_2)}) + \epsilon_i]}{(1 + \rho^{(P_1P_2)})^2}$$

formula (32) is made to be equal to 0, and a solution is:

$$\rho^{(P_1P_2)} = \frac{\sum_{k=1}^{N}\left[(T_{2,i}^{(P_2)} - T_{1,i}^{(P_1)} - d^{(P_1P_2)})(T_{2,i}^{(P_2)} - T_{2,i-1}^{(P_2)} - 2d^{(P_1P_2)} + 2\epsilon_i) - (T_{2,i-1}^{(P_2)} - T_{1,i}^{(P_1)} - d^{(P_1P_2)})\epsilon_i + \epsilon_i^2\right]}{\sum_{k=1}^{N}\left[(T_{2,i}^{(P_2)} - T_{1,i}^{(P_1)} - d^{(P_1P_2)})(T_{2,i-1}^{(P_2)} - 2T_{1,i}^{(P_1)} + T_{2,i}^{(P_2)}) + (T_{1,i}^{(P_1)} - T_{2,i-1}^{(P_2)} - d^{(P_1P_2)})(T_{2,i}^{(P_2)} - T_{2,i-1}^{(P_2)} + \epsilon_i)\right]} \quad (33)$$

$P_2$ only needs to obtain parameters in formula (33) to estimate $\rho^{(P_1P_2)}$; by selecting appropriate $d^{(P_1P_2)}$ value, $\rho^{(P_1P_2)}$ can be adjusted so that frequencies of node $P_2$ and node $P_1$ are gradually close, to complete time synchronization of $P_2$ and $P_1$.

8. The cross-network time synchronization method for industrial wireless network and TSN fusion according to claim 1, characterized in that: in step S4, the node device of the industrial wireless network is used as the master clock, denoted as M; the terminal side conversion node is used as the slave clock, denoted as S; node S periodically sends ordinary data packets to node M; and synchronization information is transferred implicitly by controlling a response time interval $\Delta_i$ of a receiver for a sender;

In the $i^{th}$ cycle, sending node S sends an ordinary data packet to receiving node M at time $T_{1,i}^{(S)}$, and receiving node M receives the data packet at time $T_{2,i}^{(M)}$; after waiting for the response time interval $\Delta_i$, a response message is returned to sending node S at time $T_{3,i}^{(M)}$ and sending node S receives the response message at time $T_{4,i}^{(S)}$; then local receiving and sending time is recorded and stored in a local cache; with repeated processes of receiving and sending node data packets, the node can use the receiving and sending time of the local cache to estimate the clock frequency offset.

9. The cross-network time synchronization method for industrial wireless network and TSN fusion according to claim 8, characterized in that: number of time synchronizations in step S4 is set as N; there is $A \in \{2, 3, 4, \ldots N-1\}$; any of prime numbers P, Q and D is taken, where N=P*Q; when (D*E)mod((P−1)*(Q−1))=1 is established, there is $C=(A_i \text{ EXP } D) \text{mod } N$; where 1<i<N; $C_i$ is a generated random number; meanwhile, $C_i$ is used to represent a response time interval $\Delta_i$ that a receiving node needs to wait for in an $i^{th}$ synchronization process;

$f_S$ and $f_M$ are set as crystal oscillator frequencies of node S and node M respectively, and a clock frequency offset $$\rho^{(MS)} = \frac{f_M}{f_S}$$

of node S relative to node M is defined;

in the first synchronization cycle, when node S sends an ordinary data packet to node M at time $T_{1,1}^{(S)}$, time $T_{2,1}^{(M)}$ when node M receives the data packet is represented as a formula below:

$$T_{2,1}^{(M)} = \rho^{(MS)} \times T_{1,1}^{(S)} + \theta_{t_0} + \rho^{(MS)} \times (d_1 + X_1) \quad (34)$$

where $\theta_{t_0}$ represents an initial clock offset of node S relative to node M; $d_1$ represents fixed time delay generated in a process of receiving and sending the data packets; $X_1$ represents random time delay generated in the process of receiving and sending the data packets; Time $T_{3,1}^{(M)}$ when node M sends a response message can be obtained according to an RSA algorithm, i.e., $T_{3,1}^{(M)} = T_{2,1}^{(M)} + \Delta_2$; time when node S receives the response message sent by node M is denoted as $T_{4,1}^{(S)}$, then:

$$T_{3,1}^{(M)} = \rho^{(MS)} \times T_{4,1}^{(S)} + \theta_{t_0} - \rho^{(MS)} \times (d_2 + Y_1) \quad (35)$$

where $d_2$ is fixed time delay of the response message in transmission, and $d_2=d_1-m$; here, the size of m is in direct proportion to a difference between length of uplink data packet messages and length of downlink response messages; $Y_1$ is downlink random time delay in the first synchronization cycle;

in the second synchronization cycle, node S sends an ordinary data packet to node M at time $T_{1,2}^{(S)}$ and node M receives the data packet at time $T_{2,2}^{(M)}$; a value of the response time interval $\Delta_2$ in the second synchronization cycle is obtained according to the RSA algorithm; at this moment, time when node M sends a response message is $T_{3,2}^{(M)} = T_{2,2}^{(M)} + \Delta_2$, and then:

$$T_{3,2}^{(M)} = \rho^{(MS)} \times T_{4,2}^{(S)} + \theta_{t_0} - \rho^{(MS)} \times (d_2 + Y_2) \quad (36)$$

where $d_2$ is fixed time delay generated by the data packets in a process of receiving and sending the data packets in the second synchronization cycle; and $Y_2$ is downlink random time delay in the second synchronization cycle;

in the third synchronization cycle, node S sends an ordinary data packet to node M at time $T_{1,3}^{(S)}$, and node M receives the data packet at time $T_{2,3}^{(M)}$; a value of the response time interval $\Delta_3$ in the third synchronization cycle is obtained according to the RSA algorithm; at this moment, time when node M sends a response message is $T_{3,3}^{(M)} = T_{2,3}^{(M)} + \Delta_3$, and then:

$$T_{3,3}^{(M)} = \rho^{(MS)} \times T_{4,3}^{(S)} + \theta_{t_0} - \rho^{(MS)} \times (d_2 + Y_3) \quad (37)$$

where $Y_3$ represents downlink random time delay in the third synchronization cycle;

In the $i^{th}$ synchronization cycle, node S sends an ordinary data packet to node M at time $T_{1,i}^{(S)}$, and node M receives the data packet at time $T_{2,i}^{(M)}$; a value of the response time interval $\Delta_i$ in the $i^{th}$ cycle can be obtained according to the RSA algorithm; at this moment, time when node M sends a response message is $T_{3,i}^{(M)}$; node S receives the response message returned by node M at time $T_{4,i}^{(S)}$, to obtain:

$$T_{2,i}^{(M)} = \rho^{(MS)} \times T_{1,i}^{(S)} + \theta_{t_0} + \rho^{(MS)} \times (d_1 + X_i) \quad (38)$$

$$T_{3,i}^{(M)} = \rho^{(MS)} \times T_{4,i}^{(S)} + \theta_{t_0} - \rho^{(MS)} \times (d_2 + Y_i) \quad (39)$$

$$\Delta_i \in (\Delta_2, \Delta_3, \ldots, \Delta_{N-1}) \quad (40)$$

$$T_{3,i}^{(M)} = T_{2,i}^{(M)} + \Delta_i \quad (41)$$

after $N-1$ synchronization cycles, sending node S obtains a set of local timestamp pairs $\{T_{1,i}^{(S)}, T_{4,i}^{(S)}\}_{i=2}^{N-1}$, and receiving node M obtains a set of local timestamp pairs $\{T_{2,i}^{(M)}, T_{3,i}^{(M)}\}_{i=2}^{N-1}$; combined with the response time interval $\Delta_i$, the maximum likelihood estimation method is used to estimate frequency offset and fixed delay between nodes;

formulas (39)-(38) are used to obtain:

$$T_{3,i}^{(M)} - T_{2,i}^{(M)} = \rho^{(MS)}\left[T_{4,i}^{(S)} - T_{1,i}^{(S)} - (d_1 + d_2) - (X_i + Y_i)\right] \quad (42)$$

because $X_i$ and $Y_i$ are Gaussian random distributions with mean of 0 and variance of $\sigma^2$ and $V_i = X_i + Y_i$ is made, $V_i$ is Gaussian random distribution with mean of 0 and variance of $2\sigma^2$ and $$\alpha = \frac{1}{\rho^{(MS)}}$$

is made; then formula (42) is simplified as:

$$\alpha\left(T_{3,i}^{(M)} - T_{2,i}^{(M)}\right) = \left(T_{4,i}^{(S)} - T_{1,i}^{(S)}\right) - 2d_1 + m - V_i \quad (43)$$

where $T_{3,i}^{(M)} - T_{2,i}^{(M)} = \Delta_i$, and then formula (43) is expressed as a matrix form below:

$$\begin{bmatrix} T_{4,2} - T_{1,2} + m \\ T_{4,3} - T_{1,3} + m \\ \ldots \\ T_{4,N-1} - T_{1,N-1} + m \end{bmatrix} = \begin{bmatrix} T_{3,2} - T_{2,2} & 2 \\ T_{3,3} - T_{2,3} & 2 \\ \ldots & 2 \\ T_{3,N-1} - T_{2,N-1} & 2 \end{bmatrix} \begin{bmatrix} \alpha \\ d_1 \end{bmatrix} + \begin{bmatrix} V_2 \\ V_3 \\ \ldots \\ V_{N-1} \end{bmatrix} \quad (44)$$

a maximum likelihood function of formula (44) about parameters $(\alpha, d_1, \sigma^2)$ is expressed as:

$$L(\alpha, d_1, \sigma^2) = (2\pi \times 2\sigma^2)^{-\frac{N-1}{2}} \exp\left\{-\frac{1}{2 \times 2\sigma^2} \Sigma_{i=2}^{i=N-1}\left[\left(T_{4,i}^{(S)} - T_{1,i}^{(S)}\right) - \alpha\Delta_i - 2d_1 + m\right]^2\right\} \quad (45)$$

logarithms of both sides of formula (45) are calculated to obtain:

$$\ln L(\alpha, d_1, \sigma^2) = -\frac{N-1}{2}\ln(4\pi\sigma^2) - \qquad (46)$$

$$\frac{1}{4\sigma^2}\Sigma_{i=2}^{N-1}\left[\left(T_{4,i}^{(S)} - T_{1,i}^{(S)}\right) - \alpha\Delta_i - 2d_1 + m\right]^2$$

a first-order partial derivative about $\alpha$ for formula (46) is calculated to obtain:

$$\frac{\partial \ln L(\alpha, d_1, \sigma^2)}{\partial \alpha} = \frac{1}{2\sigma^2}\Sigma_{i=2}^{N-1}\left[\left(T_{4,i}^{(S)} - T_{1,i}^{(S)} - \alpha\Delta_i - 2d_1 + m\right)\Delta_i\right] \qquad (47)$$

a first-order partial derivative about $d_1$ for formula (46) is calculated to obtain:

$$\frac{\partial \ln L(\alpha, d_1, \sigma^2)}{\partial d_1} = \frac{1}{\sigma^2}\Sigma_{i=2}^{N-1}\left(T_{4,i}^{(S)} - T_{1,i}^{(S)} - \alpha\Delta_i - 2d_1 + m\right) \qquad (48)$$

formula (47) and formula (48) are made as 0, and maximum likelihood functions of $\rho^{(MS)}$ and $d_1$ can be obtained by simultaneous solution:

$$\rho^{(MS)} = \frac{1}{\alpha} = \frac{(N-2)\Sigma_{i=2}^{N-1}\Delta_i^2 - \left(\Sigma_{i=2}^{N-1}\Delta_i\right)^2}{(N-2)\Sigma_{i=2}^{N-1}\left[\left(T_{4,i}^{(S)} - T_{1,i}^{(S)} + m\right)\Delta_i\right] - \Sigma_{j=2}^{N-1}\left(T_{4,i}^{(S)} - T_{1,i}^{(S)} + m\right)\Sigma_{i=2}^{N-1}\Delta_i} \qquad (49)$$

$$d_1 = \frac{\Sigma_{i=2}^{N-1}\Delta_i^2\Sigma_{i=2}^{N-1}\left(T_{4,i}^{(S)} - T_{1,i}^{(S)} + m\right) - \Sigma_{i=2}^{N-1}\left[\left(T_{4,i}^{(S)} - T_{1,i}^{(S)} + m\right)\Delta_i\right]\Sigma_{i=2}^{N-1}\Delta_i}{2\left[(N-2)\Sigma_{i=2}^{N-1}\Delta_i^2 - \left(\Sigma_{i=2}^{N-1}\Delta_i\right)^2\right]} \qquad (50)$$

thus, the fixed time delay of the response message in transmission is $d_2 = d_1 - m$;

after the terminal side conversion node and the node device of the industrial wireless network complete synchronization, the TSN switch of the TSN 1 completes synchronization with the terminal side conversion node in the slave clock state, and a synchronization method is consistent with step S1.

\* \* \* \* \*